(12) United States Patent
Nguyen et al.

(10) Patent No.: US 11,956,752 B2
(45) Date of Patent: Apr. 9, 2024

(54) ANGLE OF ARRIVAL DETERMINATION IN ELECTRONIC DEVICES WITH FUSED DECISION FROM MOTION

(71) Applicant: Samsung Electronics Co., Ltd., Suwon-si (KR)

(72) Inventors: Hoang Viet Nguyen, Plano, TX (US); Yuming Zhu, Plano, TX (US); Neha Dawar, Plano, TX (US); Boon Loong Ng, Plano, TX (US); Yi Yang, Suwon-si (KR); Moonseok Kang, Suwon-si (KR); Aditya Vinod Padaki, Richardson, TX (US); Songwei Li, McKinney, TX (US); Moongee Cho, Seoul (KR); Hyunchul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 17/444,049

(22) Filed: Jul. 29, 2021

(65) Prior Publication Data
US 2022/0039059 A1 Feb. 3, 2022

Related U.S. Application Data

(60) Provisional application No. 63/059,843, filed on Jul. 31, 2020.

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0284* (2013.01); *G01S 5/145* (2013.01)

(58) Field of Classification Search
CPC ..... H04W 64/006; G01S 5/0284; G01S 5/145
See application file for complete search history.

(56) References Cited

U.S. PATENT DOCUMENTS 6,104,345 A 8/2000 Tweg et al.
9,841,493 B2 12/2017 Sen et al.
(Continued)

FOREIGN PATENT DOCUMENTS

JP 2019-219373 A 12/2019

OTHER PUBLICATIONS

International Search Report and Written Opinion of the International Searching Authority in connection with International Application No. PCT/KR2021/010023 dated Nov. 24, 2021, 6 pages.

(Continued)

*Primary Examiner* — Moustapha Diaby

(57) ABSTRACT

A method includes obtaining signal information based on wireless signals communicated between an electronic device and a target device. The method also includes obtaining motion information based on movement of the electronic device. The method further includes identifying first location information based on the signal information, the first location information indicating whether the target device is within a field of view (FoV) of the electronic device. Additionally, the method includes identifying second location information based on the motion information and the signal information, the second location information indicating whether the target device is within the FoV of the electronic device. The method also includes determining that the target device is within the FoV or outside the FoV of the electronic device based on at least one of the first location information or the second location information.

20 Claims, 17 Drawing Sheets

(51) Int. Cl.
    *G01S 5/14*          (2006.01)
    *H04W 4/02*       (2018.01)

(56) References Cited

U.S. PATENT DOCUMENTS

| | | |
|---|---|---|
| 10,153,549 B2 | 12/2018 | Robinson et al. |
| 10,356,553 B2 | 7/2019 | Sant et al. |
| 10,567,905 B2 | 2/2020 | Edge et al. |
| 10,718,849 B2 | 7/2020 | Siessegger et al. |
| 10,754,025 B2 | 8/2020 | Asghar et al. |
| 10,915,796 B2 | 2/2021 | Yang et al. |
| 11,320,509 B2 | 5/2022 | Ertan et al. |
| 2008/0088707 A1 | 4/2008 | Iwaki et al. |
| 2016/0358459 A1 | 12/2016 | Singhar et al. |
| 2018/0067189 A1* | 3/2018 | Sen .................... G01S 5/02 |
| 2018/0088208 A1 | 3/2018 | Gagrani et al. |
| 2018/0164801 A1* | 6/2018 | Kim .................... G05D 1/0033 |
| 2019/0219662 A1* | 7/2019 | Siessegger ........... G01C 21/206 |
| 2019/0317177 A1* | 10/2019 | Ertan ................... G01S 13/75 |
| 2019/0342707 A1* | 11/2019 | Sant .................... H04W 4/026 |

OTHER PUBLICATIONS

Extended European Search Report dated Dec. 13, 2023 regarding Application No. 21848603.3, 9 pages.

\* cited by examiner

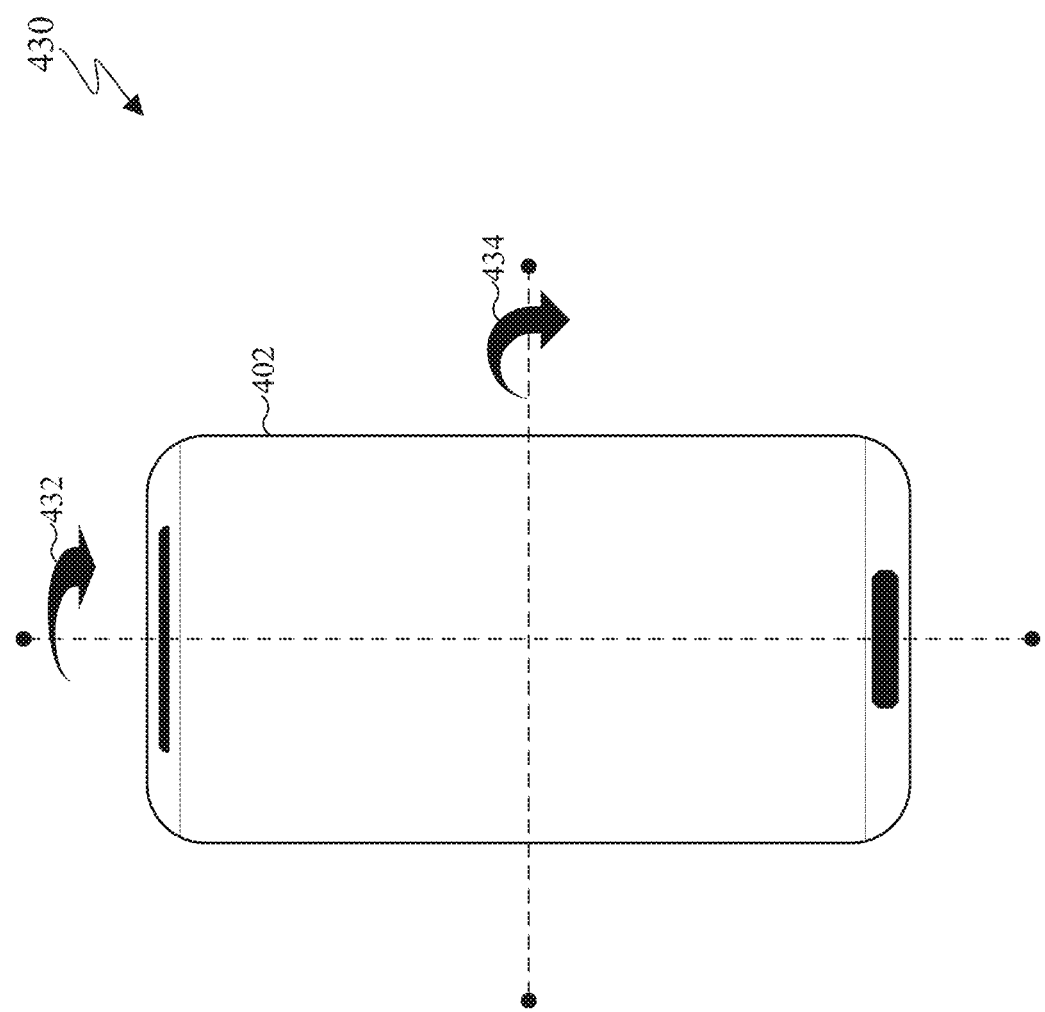

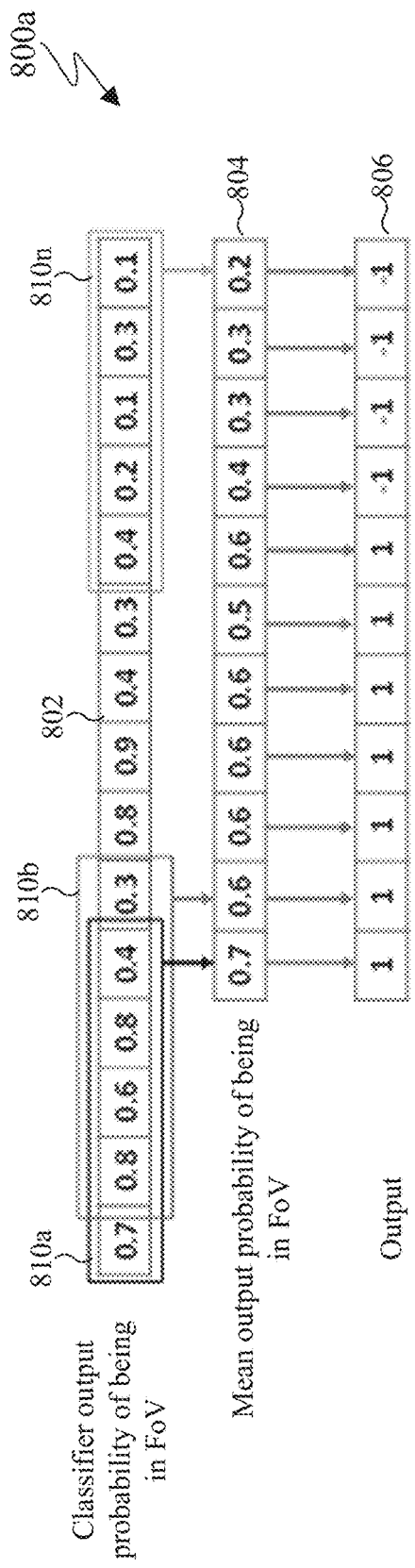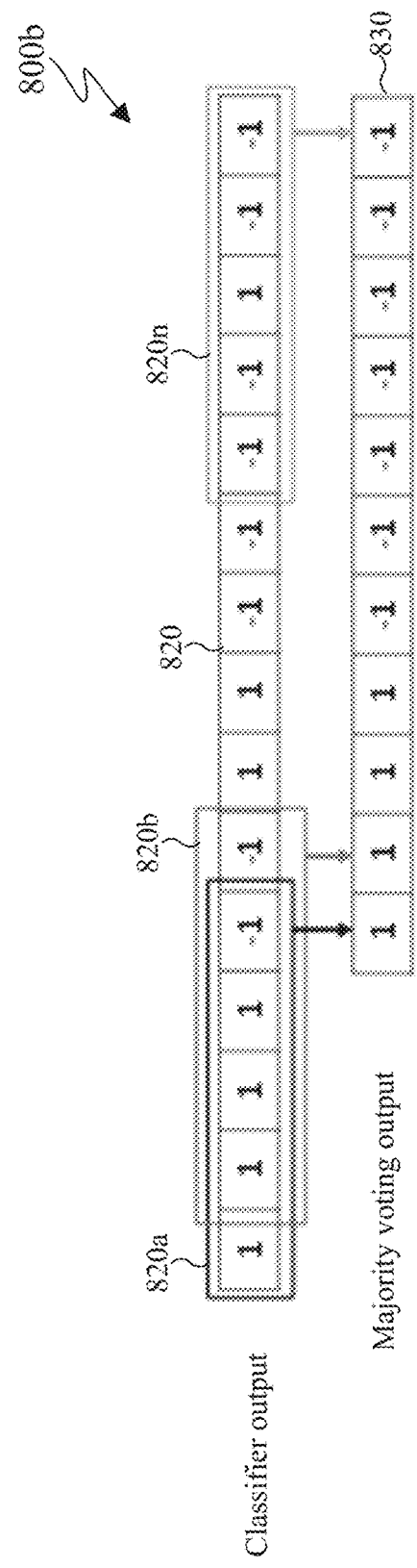
FIG. 8A
FIG. 8B

ANGLE OF ARRIVAL DETERMINATION IN ELECTRONIC DEVICES WITH FUSED DECISION FROM MOTION

CROSS-REFERENCE TO RELATED APPLICATION AND CLAIM OF PRIORITY

This application claims priority under 35 U.S.C. § 119(e) to U.S. Provisional Patent Application No. 63/059,843 filed on Jul. 31, 2020. The above-identified provisional patent application is hereby incorporated by reference in its entirety.

TECHNICAL FIELD

This disclosure relates generally to localizing an electronic device. More specifically, this disclosure relates to angle of arrival in electronic devices with fused decision from motion.

BACKGROUND

The use of mobile computing technology has greatly expanded largely due to usability, convenience, computing power, and the like. One result of the recent technological development is that electronic devices are becoming more compact, while the number of functions and features that a given device can perform is increasing. Certain electronic devices can determine whether another device is within its field of view. For example, an electronic device can transmit and receive signals with other devices and determine an angle of arrival (AoA) of the received signals and a distance between the devices. The signals can be corrupted which can create inaccurate AoA and range determinations. Inaccurate AoA and range determinations, can cause the electronic device to incorrectly determine that another electronic device is within its field of view or outside its field of view.

SUMMARY

This disclosure provides angle of arrival capability in electronic device.

In one embodiment, a method is provided. The method includes obtaining signal information based on wireless signals communicated between an electronic device and a target device. The method also includes obtaining motion information based on movement of the electronic device. The method further includes identifying first location information based on the signal information, the first location information indicating whether the target device is within a field of view (FoV) of the electronic device. Additionally, the method includes identifying second location information based on the motion information and the signal information, the second location information indicating whether the target device is within the FoV of the electronic device. The method also includes determining that the target device is within the FoV or outside the FoV of the electronic device based on at least one of the first location information or the second location information.

In another embodiment, an electronic device is provided. The electronic device includes a processor. The processor is configured to obtain signal information based on wireless signals communicated between the electronic device and a target device. The processor is also configured to obtain motion information based on movement of the electronic device. The processor is further configured to identify first location information based on the signal information, the first location information indicating whether the target device is within a FoV of the electronic device. Additionally, the processor is configured to identify second location information based on the motion information and the signal information, the second location information indicating whether the target device is within the FoV of the electronic device. The processor is also configured to determine that the target device is within the FoV or outside the FoV of the electronic device based on at least one of the first location information or the second location information.

In yet another embodiment a non-transitory computer readable medium containing instructions is provided. The instructions that when executed cause at least one processor to obtain signal information based on wireless signals communicated between an electronic device and a target device. The instructions that when executed also cause at least one processor to obtain motion information based on movement of the electronic device. The instructions that when executed further cause at least one processor to identify first location information based on the signal information, the first location information indicating whether the target device is within a FoV of the electronic device. Additionally, the instructions that when executed cause at least one processor to identify second location information based on the motion information and the signal information, the second location information indicating whether the target device is within the FoV of the electronic device. The instructions that when executed also cause at least one processor to determine that the target device is within the FoV or outside the FoV of the electronic device based on at least one of the first location information or the second location information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4C illustrates examples of changing the orientation an electronic device according to embodiments of the present disclosure;

FIGS. 8A and 8B illustrate example moving average filters for a transceiver based FoV detection operation according to embodiments of the present disclosure;

DETAILED DESCRIPTION

Figure 1:
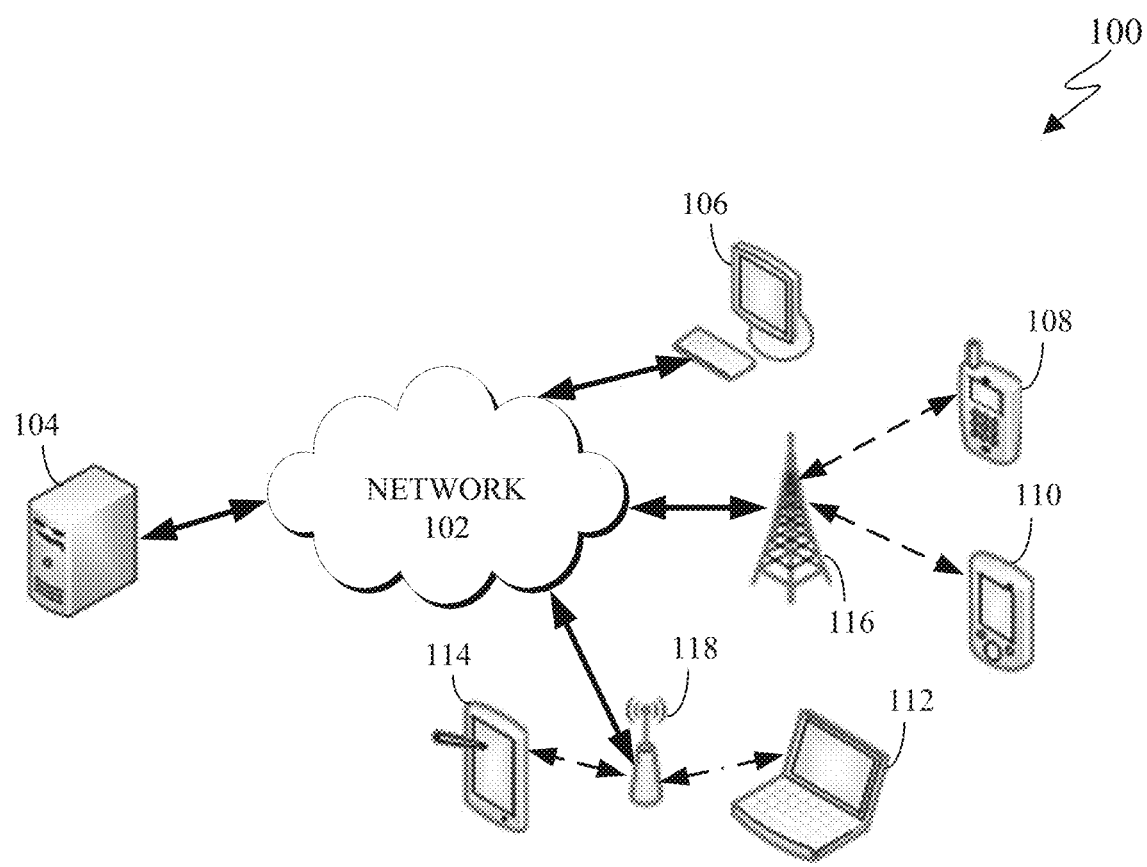
FIG. 1 illustrates an example communication system according to embodiments of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

In certain embodiments, an electronic device can include a receiver (or a transceiver) and one or more target devices can include a transmitter (or transceiver). The receiver (or transceiver) of the electronic device can be can ultra-wide-band (UWB) receiver (or UWB transceiver). Similarly, the transmitter (or transceiver) target devices can be a UWB transmitter (or UWB transceiver). The electronic device can measure angle of arrival (AoA) of a UWB signal transmitted by the target device.

UWB signals can provide centimeter level ranging. For example, if the target device is within line of sight (LOS) of the electronic device, the electronic device can determine the range (distance) between the two devices with an accuracy that is within ten centimeters. Alternatively if the target device is not within a LOS of the electronic device, the electronic device can determine the range between the two devices with an accuracy that is within fifty centimeters. Additionally, if the target device is within LOS of the electronic device, the electronic device can determine the AoA between the two devices with an accuracy that is within three degrees.

Embodiments of the present disclosure provide systems and methods to identify where a target device is with respect to a field of view (FoV) of an electronic device. FoV can be any range of angles around a boresight within which the target can be defined as identifiable or present. When there is a direct line of sight (LOS) between the target device and the electronic device and the range and AoA measurements are good, then the target device can be identified by on AoA measurements. However, the range and AoA measurements can be corrupted due to multipath and non-line of sight (NLOS) scenarios. Non-isotropic antenna radiation patterns can also result in low quality of AoA measurements. For example, when the signal received for the direct path between the target and the device is weak, it is possible that the signal received for the reflected path from the environment will be strong enough to be used for AoA measurements. Those AoA measurements will give false reports of where the target is located.

Embodiments of the present disclosure describe systems and methods to identify if the target is in the FoV of the device. Determining whether the target is in the FoV provides an indication of whether the range and AoA measurements are of good quality. If the measurement quality is good, a subsequent tracking filter can help smoothen the sporadic errors from the measurements. If the measurement quality is bad, the filter could help temporarily track the target device using the user phone's inertial sensors. The output range and AoA measurements after the post processing provide an accurate indication of where the target device is with respect to the user device. This is useful in achieving better user experience in applications like finding objects or augmented reality (AR).

Embodiments of the present disclosure provide systems and methods to identify the location of the target device using UWB signals. UWB measurements become negatively impacted due to the environment that the electronic device and the target device are within. Based on the environment, the location of the target device relative to the electronic device may be difficult to determine, such as when the electronic device is unable to be determine whether the received signals came directly from the target device or were a reflection off of an object in the environment.

Embodiments of the present disclosure recognize and take into consideration that without post processing an electronic device may be unable to determine whether a received signal came directly from a target device or if the signal was a reflection (referred to as a multipath effect). Accordingly, embodiments of the present disclosure provide systems and methods to evaluate the quality of the measurements and adaptively run a tracking filter based on the measurements.

According to embodiments of the present disclosure an electronic device determines whether a target device is within its FoV based on measurements from a transceiver and measurements from a motion sensor. Using both measurements from a transceiver and measurements from a motion sensor, an electronic device can generate an indication of where a target device is with respect to itself or another device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like.

The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from the received signals. In certain embodiments, a neural network is included within any of the client devices 106-114. When a neural network is included in a client device, the client device can use the neural network to extract features from the received signals, without having to transmit content over the network 102. Similarly, when a neural network is included in a client device, the client device can use the neural network to identify whether another client device is within the field of view of the client deice that includes the neural network.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring transceiver. In certain embodiments, any of the client devices 106-114 can emit and collect UWB signals via a measuring transceiver.

In this example, some client devices 108-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As illustrated, the laptop computer 112 can communicate with the mobile device 108. Based on the wireless signals which are communicated between these two devices, a device (such as the laptop computer 112, the mobile device 108, or another device, such as the server 104) obtaining channel information, range information, and AoA information. Channel information can include features of a channel impulse response (CIR) of a wireless channel between the laptop computer 112 and the mobile device 108. The range can be an instantaneous distance or variances in the distances between the laptop computer 112 and the mobile device 108, based on the wireless signals. Similarly, the AoA can be an instantaneous AoA measurement or variances in AoA measurements between the laptop computer 112 and the mobile device 108, based on the wireless signals.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
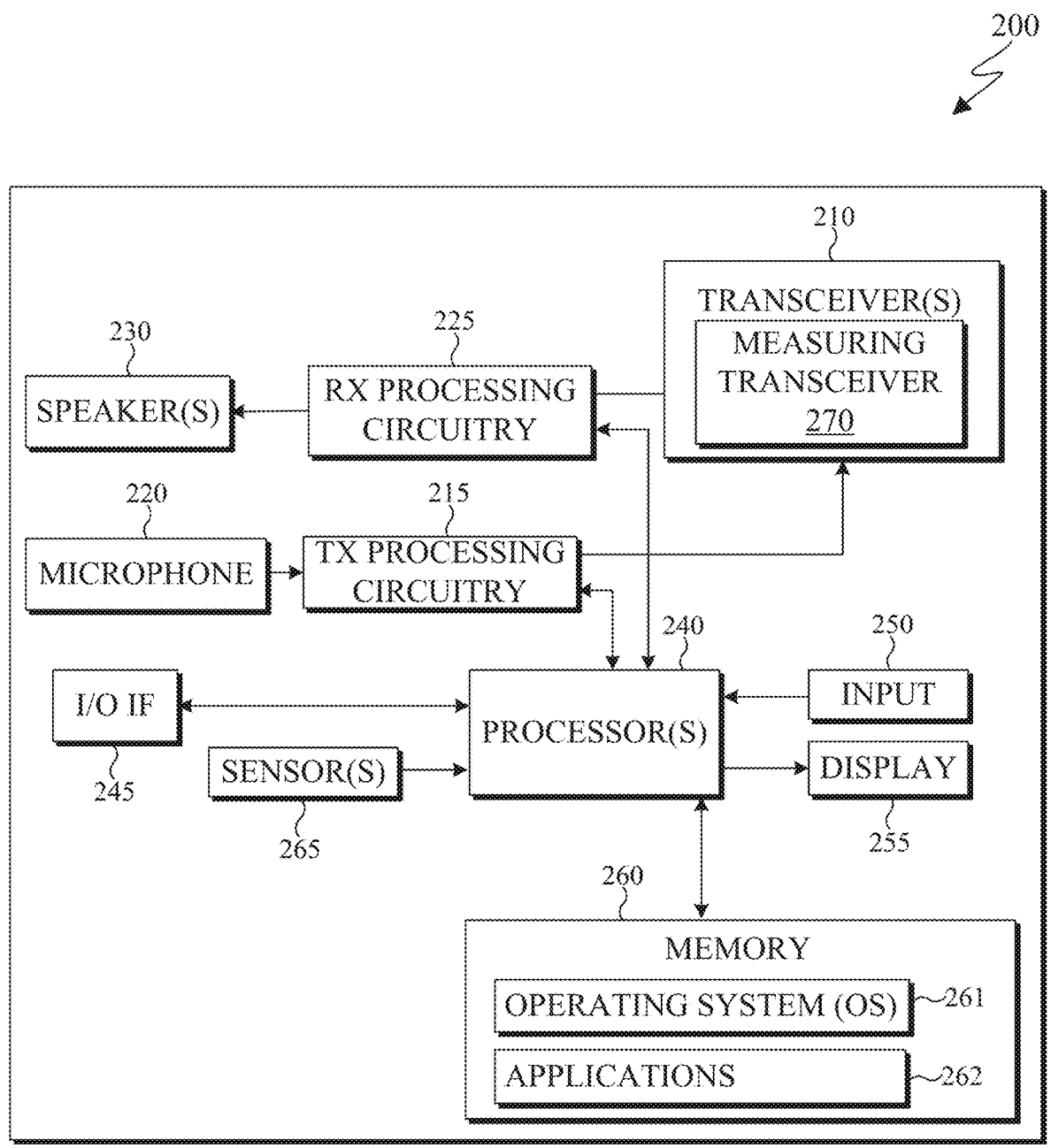
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 includes a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the measuring transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is the measuring transceiver 270. The measuring transceiver 270 is configured to transmit and receive signals for detecting and ranging purposes. The measuring transceiver 270 can transmit and receive signals for measuring range and angle of an external object relative to the electronic device 200. The measuring transceiver 270 may be any type of transceiver including, but not limited to a WiFi transceiver, for example, an 802.11ay transceiver, a UWB transceiver, and the like. In certain embodiments, the measuring transceiver 270 includes a sensor. For example, the measuring transceiver 270 can operate both measuring and communication signals concurrently. The measuring transceiver 270 includes one or more antenna arrays, or antenna pairs, that each includes a transmitter (or transmitter antenna) and a receiver (or receiver antenna). The measuring transceiver 270 can transmit signals at various frequencies, such as in UWB. The measuring transceiver 270 can receive the signals from an external electronic device also referred to as a target device) for determining whether the external electronic device within the FoV of the electronic device 200.

The transmitter, of the measuring transceiver 270, can transmit UWB signals. The receiver, of the measuring transceiver, can receive UWB signals from other electronic devices. The processor 240 can analyze the time difference, based on the time stamps of transmitted and received signals, to measure the distance of the target objects from the electronic device 200. Based on the time differences, the processor 240 can generate location information, indicating a distance that the external electronic device is from the electronic device 200. In certain embodiments, the measuring transceiver 270 is a sensor that can detect range and AoA of another electronic device. For example, the measuring transceiver 270 can identify changes in azimuth and/or elevation of the other electronic device relative to the measuring transceiver 270. In certain embodiments, the measuring transceiver 270 represents two or more transceivers. Based on the differences between a signal received by each of the transceivers, the processor 240 can determine the identify changes in azimuth and/or elevation corresponding to the AoA of the received signals.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
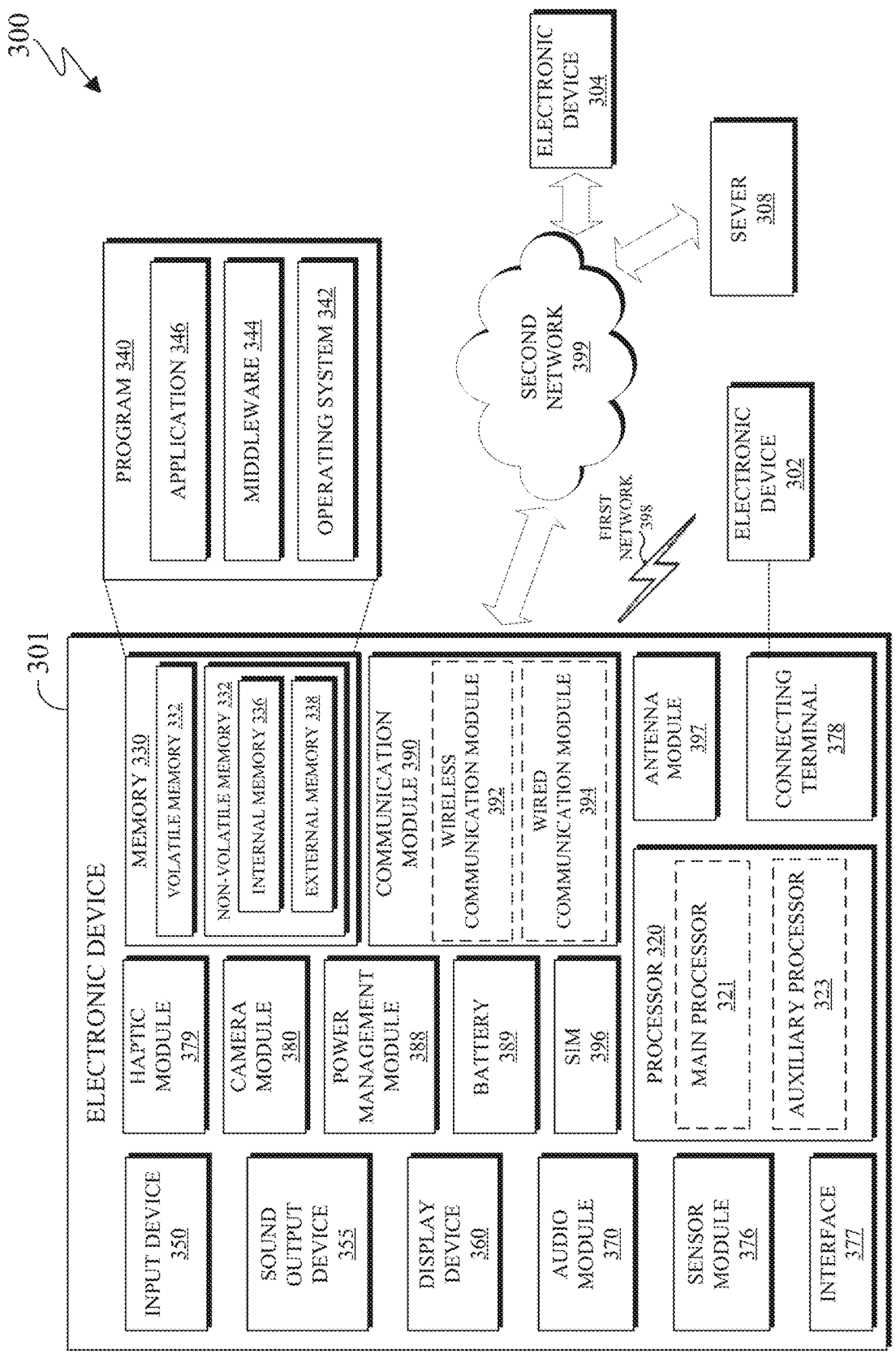
FIG. 3 illustrates an example network configuration according to embodiments of the present disclosure.

FIG. 3 illustrates an example network configuration according to embodiments of the present disclosure. An embodiment of the network configuration shown in FIG. 3 is for illustration only. One or more of the components illustrated in FIG. 3 can be implemented in specialized circuitry configured to perform the noted functions or one or more of the components can be implemented by one or more processors executing instructions to perform the noted functions.

FIG. 3 illustrated a block diagram illustrating a network configuration including an electronic device 301 in a network environment 300 according to various embodiments. As illustrated in FIG. 300, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 and/or the second network 399 can be similar to the network 102 of FIG. 1. The electronic devices 301, 302, and 304 can be similar to any of the client devices 106-114 of FIG. 1 and include similar components to that of the electronic device 200 of FIG. 2. The server 308 can be similar to the server 104 of FIG. 1.

The electronic device 301 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320 and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334.

According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software. The program 340 may include, for example, an operating system (OS) 342, middleware 344, or an application 346.

The input device 350 may receive a command or data to be used by other components (e.g., the processor 320) of the electronic device 301, from the outside (e.g., a user) of the electronic device 301. The input device 350 may include, for example, a microphone, a mouse, a keyboard, or a digital pen (e.g., a stylus pen). In certain embodiments, the input device 350 includes a sensor for gesture recognition. For example, the input device 350 can include a transceiver similar to the measuring transceiver 270 of FIG. 2.

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, or projector. According to an embodiment, the display device 360 may include touch circuitry adapted to detect a touch, or sensor circuitry (e.g., a pressure sensor) adapted to measure the intensity of force incurred by the touch. The display device 360 can be similar to the display 255 of FIG. 2.

The audio module 370 may convert a sound into an electrical signal and vice versa. According to an embodiment, the audio module 370 may obtain the sound via the input device 350, output the sound via the sound output device 355, or output the sound via a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 376 can be similar to the sensors 265 of FIG. 2.

The interface 377 may support one or more specified protocols to be used for the electronic device 101 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication.

According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, UWB, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB).

According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 may perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Although FIG. 3 illustrates one example of the electronic device 301 in the network environment 300, various changes can be made to FIG. 3. For example, various components in FIG. 3 can be combined, further subdivided, or omitted and additional components can be added according to particular needs. As a particular example, the processor 320 can be further divided into additional processors, such as one or more central processing units (CPUs), one or more graphics processing units (GPUs), one or more neural networks, and the like. Also, while FIG. 3 illustrates the electronic device 301 configured as a mobile telephone, tablet, or smartphone, the electronic device 301 can be configured to operate as other types of mobile or stationary devices.

Figure 4A:
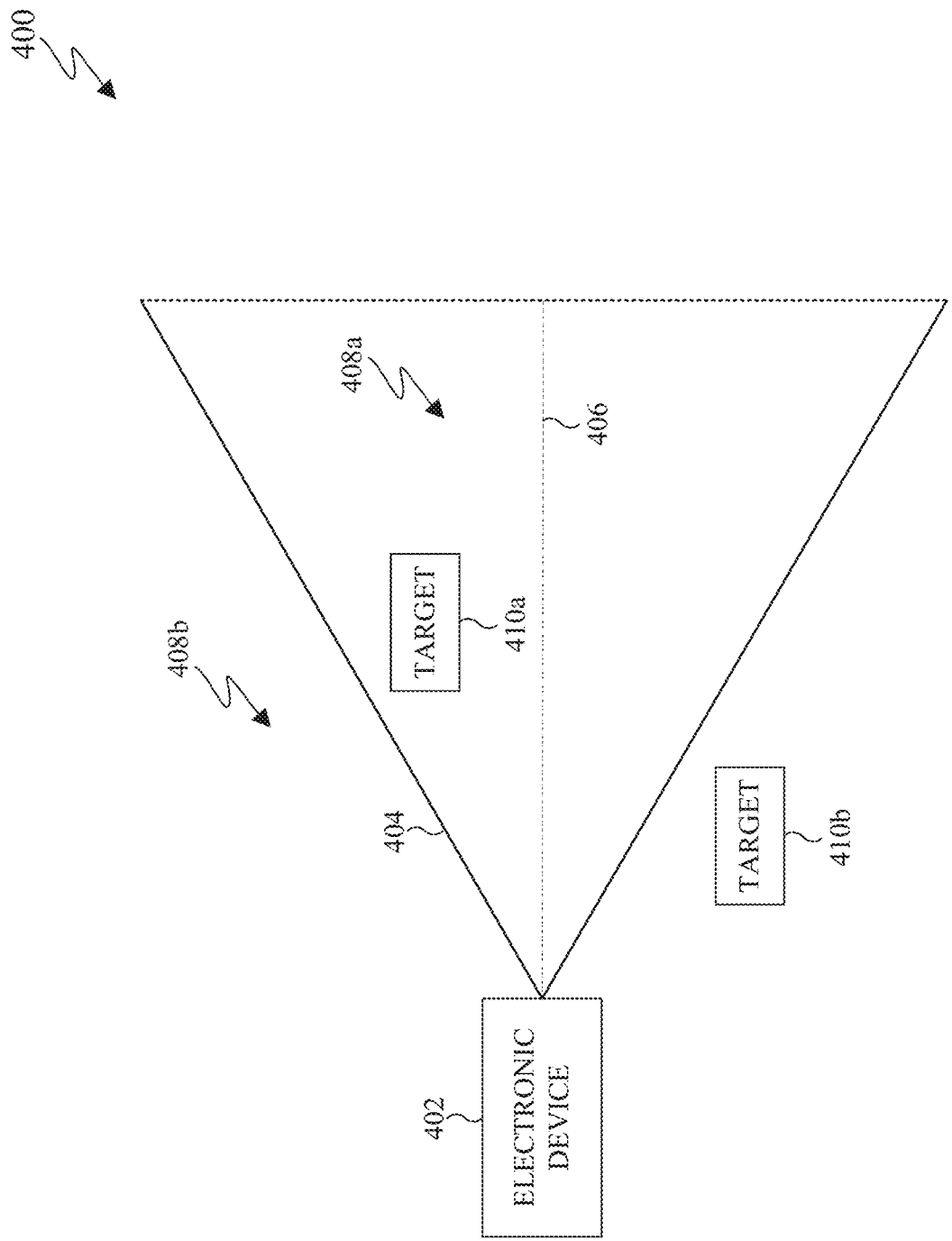
FIG. 4A illustrates an example diagram of a determination of whether target device is within a field of view (FoV) of an electronic device according to embodiments of the present disclosure.
Figure 4B:
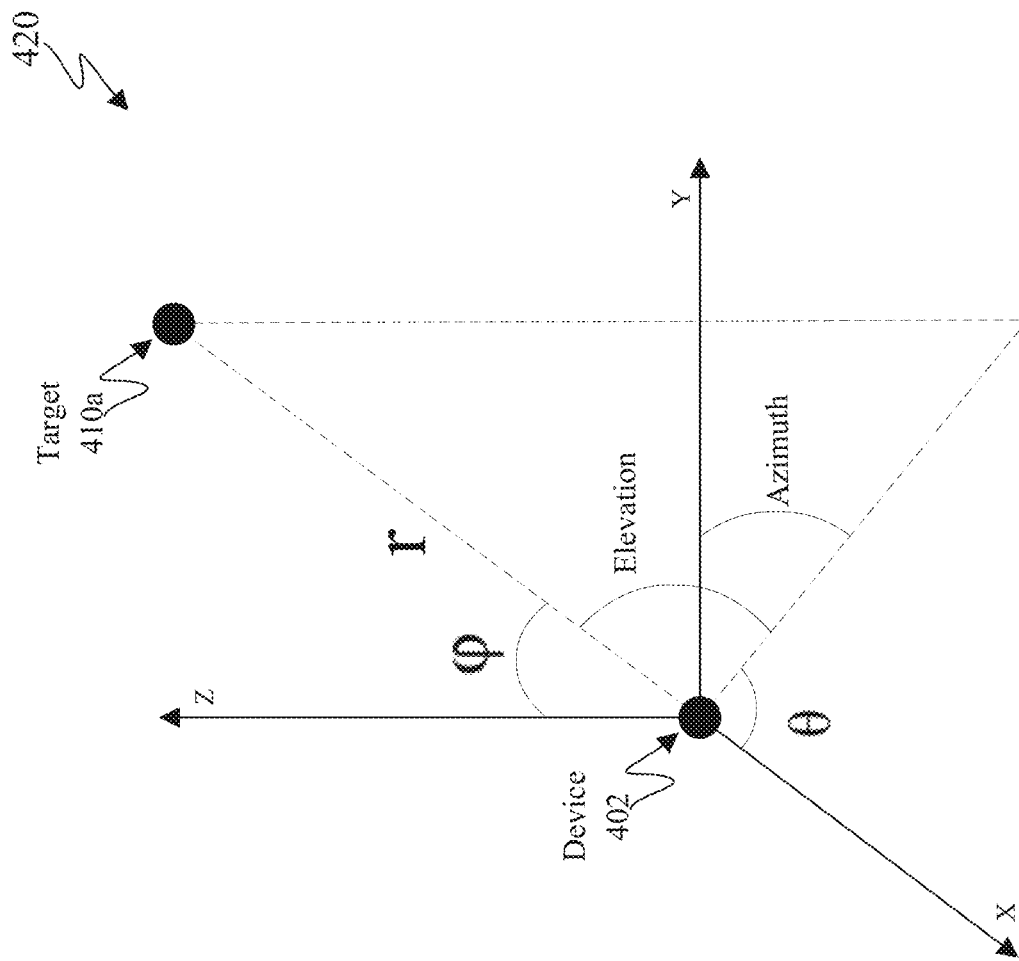
FIG. 4B illustrates an example coordinate system according to embodiments of the present disclosure.

FIG. 4A illustrates an example diagram 400 of a determination of whether a target device (such as the target device 410a or the target device 410b) is within a FoV of an electronic device 402 according to embodiments of the present disclosure. FIG. 4B illustrates an example coordinate system 420 according to embodiments of the present disclosure. FIG. 4C illustrates examples of changing the orientation of an electronic device 402 according to embodiments of the present disclosure.

The electronic device 402, the target device 410a, and the target device 410b can be any one of the client device 106-114 and can include internal components similar to that of electronic device 200 of FIG. 2 and the electronic device 301 of FIG. 3. The determination of whether the target device 410a or the target device 410b is within the field of view of the electronic device 402 can be performed by the electronic device 402, any one of the client device 106-114 or the server 104 of FIG. 1.

In certain embodiments, the electronic device 402, the target device 410a, and the target device 410b can include a transceiver, such as a UWB transceiver. Any other suitable transceiver, receiver, or transmitter may be used. Range and AoA information is obtained based on the exchange of signals between the electronic device 402, the target device 410a, and the target device 410b.

The target device 410a and the target device 410b can be a phone or a tag attached to a certain object. In certain embodiments, the electronic device 402 is identifies the location of a target device 410a or 410b with respect to some FoV of the electronic device 402, such as the FoV 408a. In other embodiments, a remote server, such as the server 104 if FIG. 1 or the server 308 of FIG. 3, receives information from the electronic device 402 and identifies the location of a target device 410a or 410b with respect to some FoV of the electronic device 402, such as the FoV 408a. The electronic device 402, the target device 410a, and the target device 410b can be any wireless-enabled device such as the mobile device 108, a smartphone, a smart watch, a smart tag, a tablet computer 114, a laptop computer 112, a smart thermostat, a wireless-enabled camera, a smart TV, a wireless-enabled speaker, a wireless-enabled power socket, and the like. Based on whether a target device is within the FoV of the electronic device can be used to help a user finding a lost personal item in a nearby area, displaying contextual menu around the electronic device 402 seen through an AR application.

As shown in FIG. 4A, the determination of whether an external electronic device (such as either of the target devices 410a or 410b) is within a FoV of another electronic device (such as the electronic device 402) is based on the size and shape of a FoV. A portion of the environment around the electronic device 402 is illustrated as FoV 408a, while another portion of the environment around the electronic device 402 is illustrated as outside FoV 408b. The boundary 404 represents an approximate boundary between the FoV 408a and outside the FoV 408b. The boresight 406 is the center of the FoV 408a. The boresight 406 can be the axis of maximum gain (e.g., maximum radiated power) of an antenna (e.g., a directional antenna) of the electronic device 402. In some instances, the axis of maximum gain coincides with the axis of symmetry of the antenna of the electronic device 402. In some implementations, the electronic device 402 includes one or more phased array antennas that can electronically steer a beam, change the angle of the boresight 406 by shifting the relative phase of the radio waves emitted by different antenna elements, radiate beams in multiple directions, and the like.

The FoV of an electronic device (such as the FoV 408a of the electronic device 402 of FIG. 4A) is a range of angles around the boresight 406, within which the target device (such as the target devices 410a and 410b) can be defined as being present based on UWB measurements or other measurements. The size and shape of a FoV can vary based on environmental conditions and the hardware of the electronic device itself.

In certain embodiments, if (i) there is a direct line of sight (LOS) between the electronic device 402 and a target device (such as the target device 410a or 410b), and (ii) range and AoA measurements are good, then to identify the presence of target as in FoV or out of FoV can be performed based on AoA measurements. However, many times, the measurements are corrupted by multipath and non-line of sight (NLOS) scenarios. Non-isotropic antenna radiation patterns can also result in low quality of AoA measurements. For example, when the signal received from a direct path between the target device (such as the target device 410b) is weak, it is possible that the signal received from a reflected path, based on the environment, can be strong enough to be used for generating the range and AoA measurements. The generated range and AoA measurements which are based on a reflected signal would give false results of where the target is. For example, the target device 410b can transmit signals to the electronic device 402. If the electronic device 402 uses a reflected signal (instead of a direct signal) the electronic device 402 can incorrectly determine that the target device 410b is located within the FoV 408a instead of its actual location which is outside the FoV 408b. Therefore, embodiments of the present disclosure address problems for determining whether the target device is in the FoV of the electronic device when the UWB measurements between them may not be very accurate.

Embodiments of the present disclosure describe methods for identifying whether the target device is within the FoV of the electronic device 402 (such as the target device 410a) or whether a target device is outside the FoV of the electronic device 402 (such as the target device 410b). Based on the determination of whether the target device is within or outside the FoV of the electronic device 402, enables a determination of whether the range measurements and AoA are of sufficient quality. Upon determining that the range information and the AoA is a good quality (such as when the target device is within the FoV of the electronic device 402) subsequent tracking filter can help smoothen the sporadic errors from the measurements. The tracking filter is described in greater details below, such as in FIGS. 5, 10A, and 10B. Alternatively, upon determining that the range information and the AoA is poor quality (such as when the target device is outside the FoV of the electronic device 402) a tracking filter could help temporarily track the target device 410b using the inertial sensors of the electronic device 402. Accordingly, the output range and AoA measurements provide an indication of where the target device 410a and 410b is with respect to the electronic device 402.

As shown in FIG. 4B, the coordinate system 420 can be used to find the distance and the relative angle that the target device 410a is from the electronic device 402. The distance and the relative angle between the target device 410a and the electronic device 402 correspond to the range and AoA measurements when the target device 410a is within the FoV of the electronic device 402. The coordinate system 420 illustrates the azimuth angle and the elevation angle between the two devices. As illustrated, the azimuth angle is the horizontal angle between the electronic device 402 and the target device 410a. Similarly, the elevation angle is the vertical angle between the electronic device 402 and the target device 410a. The coordinate system 420 illustrates the range, r, (distance) between the electronic device 402 and the target device 410a.

As shown in FIG. 4C, changing the orientation of the electronic device 402 causes the azimuth orientation and elevation orientation to change. For example, when the electronic device 402 undergoes rotation 432 causes the azimuth orientation, as shown in FIG. 4B, to change. Similarly, when the electronic device 402 undergoes rotation 434 causes the elevation orientation, as shown in FIG. 4B, to change. The changes in the orientation of the electronic device 402 can be detected by one or more motions sensors (such as an IMU sensor).

Figure 5:
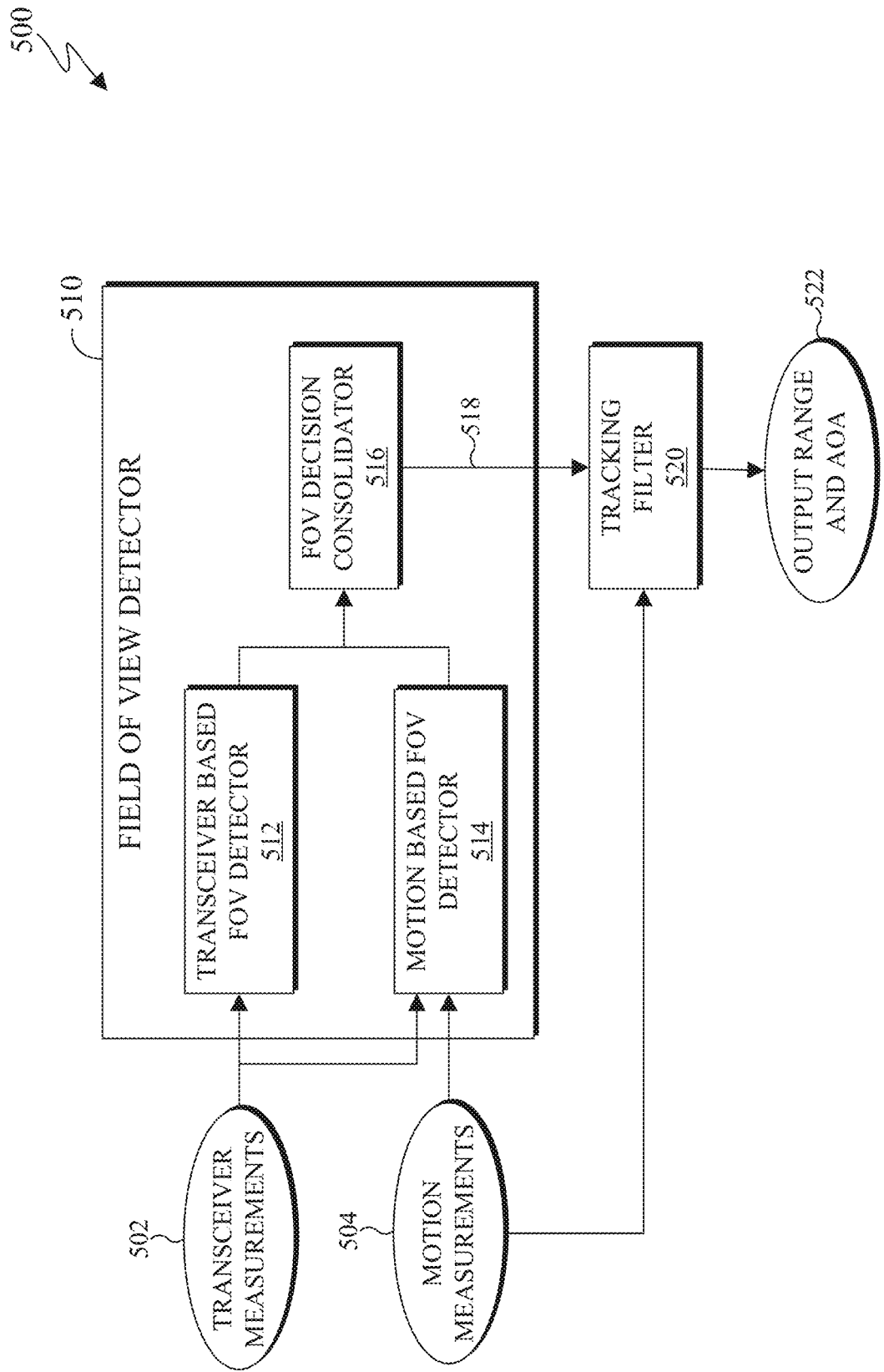
FIG. 5 illustrates an example signal processing diagram for field of view determination according to embodiments of the present disclosure.

FIG. 5 illustrates an example signal processing diagram 500 for field of view determination according to embodiments of the present disclosure. In certain embodiments, the signal processing diagram 500 can be performed by any one of the client device 106-114 or the server 104 of FIG. 1, the electronic device 402 of FIG. 4A, and can include internal components similar to that of electronic device 200 of FIG. 2 and the electronic device 301 of FIG. 3.

As discussed above, post processing can be performed to improve the quality of measurements received from transceivers and output an improved range and AoA measurements. FIG. 5 describes a signal processing diagram 500 for improving the quality of measurements received from transceivers and determining whether a target device (such as the target device 410a of FIG. 4A) is within the FoV of the electronic device.

As illustrated in FIG. 5 a FoV detector 510 receives transceiver measurements 502 and motion measurements 504 and generates an output 518. The FoV detector 510 determines whether the target device is within the FoV or outside the FoV of the electronic device. For example, the FoV detector 510 determines whether a target device (such as the target device 410a of FIG. 4A) is within an acceptable distance and field of view with respect to an electronic device (such as the electronic device 402 of FIG. 4A).

The output 518 of the FoV detector 510 includes a FoV decision (such as whether the target device is within the FoV of the electronic device or outside the view of the electronic device), range information (this distance between the electronic device and the target device), and AoA information. To generate the output 518, the FoV detector 510 performs a transceiver based FoV detector operation 512, a motion based FoV detector operation 514, and a FoV decision consolidator 516.

In certain embodiments, a tracking filter operation 520 is performed to the output 518 for smoothing the AoA and the range information based on the motion information. In other embodiments, the tracking filter operation 520 is omitted from the signal processing diagram 500. The tracking filter operation 520 can be performed by the device that includes the FoV detector 510 or another device. The tracking filter operation 520 uses one or more tracking filters to smooth the range and AoA measurements via the transceiver measurements 502 based on the motion measurements 504. In certain embodiments, more than one tracking filter can be used where each tracking with a different hypothesis. Example tracking filters include a Kalman filter, an extended Kalman filter, a particle filter, and the like. The tracking filter operation 520 generates output 522. The tracking filter operation 520 generates the output 522 by refining the range information and the AoA using a tracking filter based on the motion measurements 504. In certain embodiments, the location of the target device is determined based on a tracking filter with the ability to adapt to different conditions (such as measurement loss, bad measurements, and the like) using the tracking filter operation 520.

The output 522 can include smoothed range (in meters, centimeters or other distance based metrics). The output 522 can also include the smoothed AoA (in degrees, radians or other angle based metrics). The tracking filter operation 520 is described in in greater detail in FIGS. 10A and 10B, below.

The transceiver measurements 502 include measurements based on the received signals that are communicated between the electric device and the target device. In certain embodiments, the transceiver measurements 502 includes UWB measurements. The measurements can include as range (distance in meters, centimeters or other distance based metrics) measurements and AoA (in degrees, radians or other angle based metrics) measurements.

Figure 6:
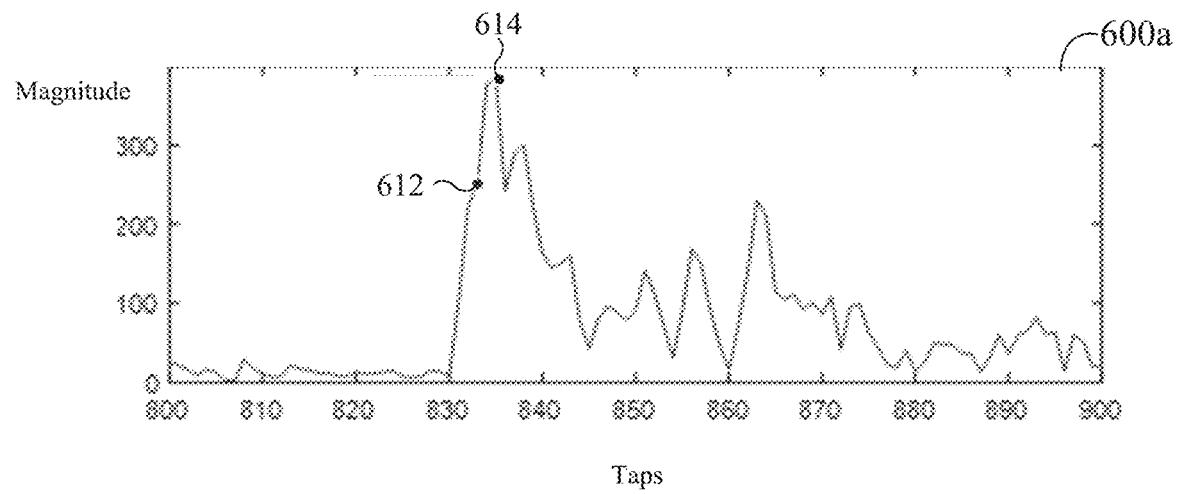
FIG. 6 illustrates example channel impulse response (CIR) graphs according to embodiments of the present disclosure.
Figure 6:
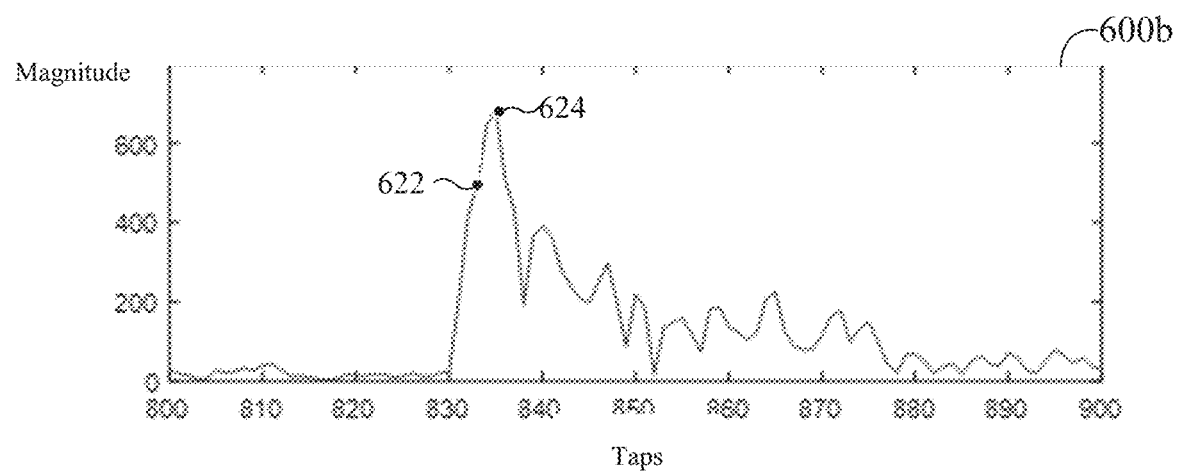

In certain embodiments, the transceiver measurements 502 includes features (such as UWB features) based on the received signals that are communicated between the electric device and the target device. In other embodiments an electronic device derives the features based on the transceiver measurements 502. Features of the transceiver measurements 502 can be derived from channel impulse response (CIR). Example features can include, but are not limited to: signal-to-noise ratio (SNR) of the first peak (in dB, in linear domain or with other relative strength indicator) from the CIR, SNR of the strongest peak (in dB, in linear domain or with other relative strength indicator) from the CIR, difference between the SNR of strongest and first peak (in dB, in linear domain or with other relative strength indicator), received signal strength (in dB or dBm), and the time difference between the first and strongest peak (in nsec, number of time samples or other time based metrics). FIG. 6 illustrates CIR graphs depicting the first peak and the strongest peak.

In certain embodiments, the transceiver measurements 502 are be received from the target device. In other embodiments, the transceiver measurements 502 are received from the electronic device based on received signals from the target device. For example, if a remote server includes the FoV detector 510, then the remote server receives the transceiver measurements 502 from the electronic device, where transceiver measurements 502 includes information of the from signals transmitted from the target device to the electronic device.

In certain embodiments, the measurements of the transceiver measurements 502 are used by the transceiver based FoV detector operation 512 and the motion based FoV detector operation 514. For example, the measurements of the transceiver measurements 502 include statistics, such as the mean and variance, on the range measurements and raw AoA measurements.

The motion measurements 504 are based on detected motion of the electronic device. The motion measurements can also include orientation of the electronic device. In certain embodiments, the motion measurements 504 are detected and quantified by the electronic device itself, such as by an IMU sensor (similar to the sensor 265 of FIG. 2 and the sensor module 376 of FIG. 3). In other embodiments, the motion measurements 504 are received from the electronic device where the motion was detected. For example, if a remote server includes the FoV detector 510, then the remote server receives the motion measurements 504 from the electronic device, where motion measurements were detected.

The transceiver based FoV detector operation 512 uses features derived from transceiver measurements 502 to identify (or generate) location information. The location information indicates whether the target device is within a FoV of the electronic device. For example, the location information is an indication of a presence of the target device relative to the FoV of the electronic device based on the transceiver measurements 502. The location information can include a label indicating whether the target device as in 'FoV' or 'out of FoV' of the electronic device based on the transceiver measurements 502.

In certain embodiments, to identify the location information, the transceiver based FoV detector operation 512 uses deterministic logic, one or more classical machine learning classifiers, a deep learning classifier, or a combination thereof for identifying the location information. The classifiers can include, but are not limited to, K-Nearest Neighbors (KNN), Support Vector Machine (SVM), Decision Tree, Random Forest, Neural Network, Convolutional Neural Network (CNN), Long Short Term Memory (LSTM), and the like.

Training data for the classifier of the transceiver based FoV detector operation 512 can be collected by obtaining multiple measurements between the electronic device and the target device in FoV and out-of-FoV in both LOS and NLOS scenarios. To add variation to the training data, measurements can be taken at different ranges between the electronic device and the target device up to a maximum usable range. Also, the environment of data collection can be varied. For example, the training data can be collected in an open space environment or in a cluttered environment prone to multipath. Additional variability can also be added to the training data such as by changing the tilting angle of the electronic device, the target device, or both devices. Similarly, the training data can include further variations such as by rotating the target device at different angles. The measurements can be labeled as per the application depending on which scenario or setup is required to be labeled as FoV and which one is supposed to be out-of-FoV. In certain embodiments, some measurements obtained for the training data are labeled as LOS and other measurements are labeled as NLOS. Labeling measurements as LOS or NLOS is described in the two step classification method described in FIG. 7, below.

Certain features from transceiver measurements 502 that can be used for machine learning classifiers include (i) statistics (such as mean, variance, and the like) on the measurements themselves (range, raw AoA measurements), and (ii) features from the CIR of the wireless channel between the electronic device and the target device.

For example, FIG. 6 illustrates example CIR graphs 600a and 600b according to embodiments of the present disclosure. In certain embodiments, the CIR graphs 600a and 600b can be created by any one of the client device 106-114 or the server 104 of FIG. 1 and can include internal components similar to that of electronic device 200 of FIG. 2 and the electronic device 301 of FIG. 3.

The CIR graphs 600a and 600b of FIG. 6 represent CIR plots from two different antennae of the electronic device. For example, the CIR graph 600a represents the CIR from one antenna of an electronic device and the CIR graph 600b represents the CIR from another antenna of the same electronic device. The CIR graphs 600a and 600b show the signal power vs. tap index of a received signal. The range and AoA measurements can be calculated based on the earliest peak with sufficient SNR in the CIR plot. The features derived from the CIR can be used by the transceiver based FoV detector operation 512.

The features derived from the CIR graphs 600a and 600b can be used to classify, via the transceiver based FoV detector operation 512, whether target device is in a FoV of the electronic device. The CIR features of the transceiver measurements 502 can include (i) absolute strength of one or multiple peaks in CIR, normally represented by SNR, (ii) difference in signal strength among multiple peaks in CIR, normally represented by SNR, (iii) time differences between multiple peaks in the CIR, (iv) phase relationship among multiple antennas used to generate the AoA information, (v) other features derived from the amplitude and phase around the peaks, and the like.

In certain embodiments, various feature vectors can be included in the transceiver measurements 502 or derived by the transceiver based FoV detector operation 512. The transceiver based FoV detector operation 512 uses the feature vectors from the transceiver measurements 502 for generating the location information indicating whether the target device is within the FoV of the electronic device. For example, the feature vector of the transceiver measurements 502 could be expressed as:

Feature Vector=[SNRFirst,SNRMain,$AoA$] (1)

Feature Vector=[SNRFirst,SNRMain−SNRFirst,$AoA$] (2)

Feature Vector=[SNRFirst,SNRMain,ToAGap,$AoA$] (3)

Feature Vector=[SNRFirst,SNRMain−SNRFirst, ToAGap,$AoA$] (4)

Feature Vector=[SNRFirst,SNRMain,ToAGap,$AoA$, RSSI] (5)

Feature Vector=[SNRFirst,SNRMain,ToAGap,$AoA$, variance($AoA$),variance(range),variance(SNR-First)] (6)

Feature Vector=[max(SNRFirst$_1$,SNRFirst$_2$),min (SNRMain$_1$−SNRFirst$_1$,SNRMain$_2$−SNRFirst$_2$), $AoA$] (7)

The feature SNRFirst corresponds to the first peak strength 612 (or the first peak strength 622) of FIG. 6 and the feature SNRMain corresponds to the strongest peak strength 614 (or the strongest peak strength 624) of FIG. 6. The feature ToAGap is the difference between first peak strength 612 and strongest peak strength 614. In certain embodiments, AoA measurements are estimated based on the phase difference from multiple antennas including, but not limited to, SNRFirst, SNRMain and ToAGap. If the electronic device is equipped with a single antenna or is operating with only a single antenna, then the AoA measurements cannot be measured and only a single CIR graph would be generated. Other features such as received signal strength indicator (RSSI) can be included in the transceiver measurements 502, such as described in the feature vector of Equation (5).

The features SNRFirst, SNRMain, and ToAGap correspond to an antenna of the electronic device. Therefore, if the measurement from multiple antennas for the features are present, each of those features can be obtained from either the same antenna or it can be a function of these CIR features obtained from different antennae. The antenna from which each of those features is used depends on the corresponding hardware characteristics as suitable for classification.

Equation (2) and Equation (4) describes the feature vector represented by a first peak strength 612 (denoted as SNRFirst), a difference between strongest peak strength 614 (SNRMain) and first peak strength 612, and AoA. Additionally, Equation (4) describes the feature vector that includes a feature corresponding to the time difference between first peak strength 612 and strongest peak strength 614 (ToAGap).

Additionally, the feature vector of Equation (7), SNRFirst$_i$ and SNRMain$_i$ are the CIR features obtained from antenna i. Therefore, if there are two antennas, SNRFirst$_1$ and SNRMain$_1$ correspond to the first antenna, and SNRFirst$_2$ and SNRMain$_2$ correspond to the second antenna.

The transceiver based FoV detector operation 512 identifies location information indication about the target device based on the transceiver measurements 502 (including the UWB features). In certain embodiments, the transceiver based FoV detector operation 512 uses UWB measurements and features which include range and AoA along with other CIR features. In certain embodiments, the transceiver based FoV detector operation 512 includes multiple classifiers.

There are several ways in which certain features from the transceiver measurements 502 (such as the SNRFirst, SNRMain, ToAGap, and the like) can be used by the transceiver based FoV detector operation 512 to identify whether the target device is in FoV of the electronic device. For example, when a direct signal path between the electronic device and the target device exists (such as under a LOS or in FoV scenario), SNRFirst and SNRMain are close and ToAGap is near-zero. In contrast, in NLOS or out-of-FoV scenario, the first peak strength 612, representing the direct signal path, is likely to be of lower magnitude and far from the strongest peak strength 614, which represents the reflected signal path. Therefore, in the NLOS or out-of-FoV scenario SNRFirst is likely smaller than SNRMain and ToaGap is likely to be large. In the cases when the signal quality is bad, the first peak strength 612 the strongest peak strength 614 are susceptible to drifting and likely to have smaller magnitude, thus the difference between SNRFirst and SNRMain, as well as the ToaGap are good indicators of whether the target device is in the FoV of the electronic device.

Variance of some of the features (such as variance of range, variance of the AoA, and variance of SNRFirst), over a certain sliding window also provide information that is useful for the transceiver based FoV detector operation 512. For example, if the window size is K, a buffer is maintained that stores previous K measurements of the features over which the variance is calculated and used in the feature vector. Instead of variance, other metrics that can measure the spread of the features can also be used.

In certain embodiments, the transceiver based FoV detector operation 512 includes an SVM classifier for classifying the target device in FoV or out-of-FoV using a feature vector of Equation (2). Additionally, the transceiver based FoV detector operation 512 includes an SVM classifier with a Gaussian kernel for classifying the target device in FoV or out-of-FoV using a feature vector of Equation (2).

SVM training involves finding a hyperplane in the N-dimensional feature space that can separate the data points in the two classes. For a data point $x_i$, if $y_i \in \{1,-1\}$ represents the corresponding label, with a positive label (a label with a value of one) representing FoV and a negative label (a label with a value of negative one) representing out-of-FoV. The optimization problem of SVM is defined as shown in Equation (8), such that Equations (9) and (10) are satisfied.

$$\min_{w,b,\xi} \frac{1}{2} w^T w + C \sum_i \xi_i \quad (8)$$

$$y_i(w^T \phi(x_i) + b) \geq 1 - \xi_i, \text{ for all } i \quad (9)$$

$$\xi_i \geq 0, \text{ for all } i \quad (10)$$

Here, C>0 represents the penalty on the error term and $\phi(x_i)$ is the projection of data point $x_i$ to a higher dimensional space.

One way of solving this minimization problem is by solving the following dual problem of Equation (11), such that Equations (12) and (13) are satisfied.

$$\max_{\lambda \geq 0} -\frac{1}{2} \sum_i \sum_j \lambda_i \lambda_j y_i y_j \phi(x_i)^T \phi(x_j) + \sum_i \lambda_i \quad (11)$$

$$\sum_i \lambda_i y_i = 0 \quad (12)$$

$$0 \leq \lambda_i \leq C, \text{ for all } i \quad (13)$$

If training data in the positive and negative classes are not balanced, the error between the two classes can be evenly distributed by using a different penalty for positive and negative class and modifying the minimization problem as shown in Equation (14), such that Equations (15) and (16) are satisfied. For example, if the data in the two classes is not balanced, then the error between two classes is evenly distributed by penalizing the two classes by a value that is inversely proportional to the amount of data in the class. One example is to use the penalty values as shown in Equation (17).

$$\min_{w,b,\xi} \frac{1}{2} w^T w + C_+ \sum_{i:y_i=1} \xi_i + C_- \sum_{i:y_i=-1} \xi_i \quad (14)$$

$$y_i(w^T \phi(x_i) + b) \geq 1 - \xi_i, \text{ for all } i \quad (15)$$

-continued $$\xi_i \geq 0, \text{ for all } i \quad (16)$$

$$C_+ = \frac{c}{\# \text{Positive class data}}, C_- = \frac{c}{\# \text{Negative class data}} \quad (17)$$

In certain embodiments, if the FoV features in LOS and NLOS are highly distinct, then the transceiver based FoV detector operation 512 could use a multi-class classifier that can distinguish between the following classes (i) LOS FoV (ii) NLOS FoV (iii) LOS out-of-FoV and (iv) NLOS out-of-FoV. In certain embodiments, the transceiver based FoV detector operation 512 uses a multi-class classifier to label (i) LOS FoV, (ii) NLOS FoV and (iii) NLOS. FoV. In certain embodiments, the transceiver based FoV detector operation 512 uses a multi-class classifier as described in FIG. 7, below.

In certain embodiments, if out-of-FoV data is not available or not sufficient for training, then a one-class classifier can be trained using just the FoV data, such as a Support Vector Data Description (SVDD) classifier.

If a classifier lacks satisfactory performance due to the feature vector (of the transceiver measurements 502) not covering the spread of features in some specific environment (due to variance of AoA, range and SNRFirst, and the like), then a more directed classifier based on additional manual logic can be included for correcting the decision of the first classifier. Variance of the features can provide information about the target being in FoV or out of FoV. Features do not vary much or vary smoothly when the target is in FoV, while fluctuations of these features increase in an out-of-FoV scenario. As such, the manual logic can utilize information about the spread of the features to correct the decision of the classifier.

That is, the transceiver based FoV detector operation 512 can determine to change the decision of a classifier based on the variances of the input. For example, if the output of a classifier of the transceiver based FoV detector operation 512 is out-of-FoV, but ToAGap is below a threshold while AoA∈FoV, the transceiver based FoV detector operation 512 can determine to change the output (from out of FoV) to FoV. Similarly, if the output of a classifier of the transceiver based FoV detector operation 512 is out-of-FoV, but SNRMain-SNRFirst is below its corresponding threshold while AoA∈FoV, the transceiver based FoV detector operation 512 determine to change the output (from out of FoV) to FoV. Alternatively, if the output of a classifier of the transceiver based FoV detector operation 512 is FoV, but variance of SNRFirst is above a threshold (or variance of range is above a threshold), then the transceiver based FoV detector operation 512 can determine to change the output (from FoV) to out-of-FoV.

For another example, if the output of a classifier of the transceiver based FoV detector operation 512 is out of FoV and the variance of AoA is below a threshold while AoA∈FoV, the transceiver based FoV detector operation 512 can determine to change the output (from out of FoV) to FoV. Similarly, if the output of a classifier of the transceiver based FoV detector operation 512 is FoV, but the variance of AoA is above a threshold and variance of range is above a range variance threshold, the transceiver based FoV detector operation 512 can determine to change output (from FoV) to out of FoV.

In certain embodiments, the transceiver based FoV detector operation 512 uses a sliding window to smooth the output of the classifier and remove outliers. For example, the transceiver based FoV detector operation 512 can label the target device as being within the FoV or out of the FoV and generate a probability (confidence score) associated with the label. The sliding window can average the output probability and compare the average to a threshold. Based on the comparison, the transceiver based FoV detector operation 512 generates the location information of whether the target device is within the FoV of the electronic device. This is described in FIG. 8A, below. Similarly, the sliding window can average the label and compare the average to a threshold. Based on the comparison, the transceiver based FoV detector operation 512 generates the location information of whether the target device is within the FoV of the electronic device. This is described in FIG. 8B, below. That is, by averaging the probability, the label, or both, removes outliers and smooths the final result of the transceiver based FoV detector operation 512.

Embodiments of the present disclosure take into consideration that it is difficult to distinguish the location of the target device relative to the electronic device using only the transceiver measurements 502. For example, it could be difficult to distinguish if the target device is in front of or behind the electronic device. It can also be difficult to distinguish if the target device is on the left or right of the electronic device or if the target device is above or below the electronic device. Therefore, embodiments of the present disclosure use a motion based FoV detector operation 514 to resolve the front/back ambiguity by correlating the transceiver measurement 502 with the motion measurements 504.

The motion based FoV detector operation 514 fuses (correlates) the transceiver measurements 502 with the motion measurements 504 to determine whether the target is in FoV of the electronic device. The motion based FoV detector operation 514 identifies additional location information. The additional location information is based on (i) the transceiver measurements 502 between the electronic device and the target device and (ii) the motion measurements 504 of the electronic device. The motion measurements can be from an IMU sensor such as an accelerometer, gyroscope, magnetometer, and the like. The additional location information indicates whether the target device is in the FoV or out of the FoV of the electric device. In certain embodiments, additional communication channel (using UWB, BLUETOOTH, WIFI, and the like) is available for the target to report its location information, the target IMU sensor information can be used in the correlation too.

In certain embodiments, the motion based FoV detector operation 514 generates the location information based on pairs of information. For example, the determines the FoV of the target device relative to the electronic device based on (i) change in AoA in horizontal plane vs. change in azimuth orientation of the electronic device, (ii) change in AoA in vertical plane vs. change in elevation orientation of the electronic device, (iii) change in range between device and target vs. the device linear movement calculated from the IMU sensors, (iv) Change in range, AoA in both horizontal and vertical plane vs. change in 3D relative position between target and user device, (v) or any combination thereof. The motion based FoV detector operation 514 is described in greater detail in FIGS. 9A, 9B, 9C, and 9D, below.

The output of the transceiver based FoV detector operation 512 and the motion based FoV detector operation 514 represents an indication of whether the target device at different time instances is in the FoV (as indicated by a value of one) or out of the FoV (as indicated by a value of negative one) of the electronic device. In certain embodiments, the output of the transceiver based FoV detector operation 512 and the motion based FoV detector operation 514 also include a confidence value. The confidence value of the transceiver based FoV detector operation 512 indicates how confident the transceiver based FoV detector operation 512 is with its decision of whether the target device is in the FoV or out of the FoV of the electronic device. Similarly, the confidence value of the motion based FoV detector operation 514 indicates how confident the motion based FoV detector operation 514 is with its decision of whether the target device is in the FoV or out of the FoV of the electronic device.

The transceiver based FoV detector operation 512 and the motion based FoV detector operation 514 are used to complement to each other. For example, the transceiver based FoV detector operation 512 performs best when there is little or no motion of the electronic device (such as when motion is below a threshold) and where the transceiver measurements 502 are steady. Embodiments of the present disclosure take into consideration that it is difficult for the transceiver based FoV detector operation 512 to distinguish if the target device is in front of or behind the electronic device. Accordingly, the motion based FoV detector operation 514 resolves the front/back ambiguity by correlating the transceiver measurement 502 with the motion measurements 504.

The FoV decision consolidator 516 combines the decisions from the transceiver based FoV detector operation 512 and the motion based FoV detector operation 514 to generate the output 518. The FoV decision consolidator 516 determines whether to use the output from the transceiver based FoV detector operation 512, the motion based FoV detector operation 514, or both based on the following three embodiments:

In an embodiment, the FoV decision consolidator 516 determines whether the electronic device is in motion. When the electronic device is in motion, the FoV decision consolidator 516 determines that the target device in in FoV or outside FoV based on the output from the motion based FoV detector operation 514 and not the output from the transceiver based FoV detector operation 512. Alternatively, when the electronic device is static (no motion or motion less than a threshold), the FoV decision consolidator 516 determines that the target device in in FoV or outside FoV based on the output from the transceiver based FoV detector operation 512 and not the output from the motion based FoV detector operation 514.

In another embodiment, the FoV decision consolidator 516 uses the decision from the transceiver based FoV detector operation 512 (i) at the beginning of each ranging or measurement session, (ii) when the tracking state of the filter is reset to its default values (due to severe measurement losses or drastic motions), (iii) when the device is still in static mode, or (iv) any combination thereof. For example, once motion is detected, the FoV decision consolidator 516 uses the decision from the motion based FoV detector operation 514, even when the electronic device is temporarily static (not in motion). When the electronic device is temporarily static, the FoV decision consolidator 516 uses the previous decision from the motion based FoV detector operation 514.

In yet another embodiment, the FoV decision consolidator 516 outputs "in FoV" when transceiver based FoV detector operation 512, the motion based FoV detector operation 514, or both produce "in FoV" decision.

In certain embodiments, the FoV decisions from transceiver based FoV detector operation 512 and the motion based FoV detector operation 514 can be combined by the FoV decision consolidator 516 for all time instances. For example, the output 518 of the FoV decision consolidator 516 is "in FoV" when both the transceiver based FoV detector operation 512 and the motion based FoV detector operation 514 determine that the target device is "in FoV." Similarly, the output 518 of the FoV decision consolidator 516 is "out of FoV" when both the transceiver based FoV detector operation 512 and the motion based FoV detector operation 514 determine that the target device is "out of FoV."

In certain embodiments, the FoV definition for the motion based FoV detector operation 514 is not necessary to be the same as the transceiver based FoV detector operation 512. For example, the boresight in FIG. 4A is 0°, the FoV definition of the motion based FoV detector operation 514 can be from −90° to +90°, whereas the FoV definition of the transceiver based FoV detector operation 512 can be from −60° to +60°. However, the FoV decision consolidator 516 resolves this difference in the FoV definitions. For example, the FoV for the FoV decision consolidator 516 can be the intersection of the two component FoVs. This approach ensures the "in FoV" decision from the FoV decision consolidator 516 happens when the quality of the transceiver measurement 502 is higher than a threshold.

In certain embodiments, the FoV decision consolidator 516 can be further refined by using optional additional logics, called negative logics, to remove false positives. For example, negative logics can operate on the output of the FoV decision consolidator 516 to generate the output 518, which includes the FoV decision, an initial range, and an initial AoA. Variance of the features can provide information about the target being in FoV or out of FoV. Features do not vary much or vary smoothly when the target is in FoV, while fluctuations of these features increase in an out of FoV scenario. As such, the negative logic can utilize information about the spread of the features to correct the decision of the classifier of the FoV decision consolidator 516.

That is, the FoV decision consolidator 516 can determine to change the decision of a classifier based on the variances of the input. For example, if the output of FoV decision consolidator 516 is "in FoV" and the variance of the range is greater than a threshold, then the FoV decision consolidator 516 can determine to change the output (from in FoV) to out of FoV. Similarly, if the output of a FoV decision consolidator 516 is FoV, but the variance of AoA is greater than a threshold, then the FoV decision consolidator 516 can determine to change output (from in FoV) to out of FoV.

In certain embodiments, if the output of the FoV decision consolidator 516 is "in FoV" but the variance of range is above a first threshold t1, the output of the FoV decision consolidator 516 is corrected to "out of FoV". In another embodiment, if the output of the FoV decision consolidator 516 is "in FoV" but the variance of AoA is above a second threshold t2, the variance of SNRFirst is above a third threshold t3, and/or the variance of range is above a fourth threshold t4, the output of the FoV decision consolidator 516 is corrected to "out of FoV". For example, as discussed in further detail below, training data can be collected by obtaining multiple UWB measurements between the electronic device and the target device in FoV and out-of-FoV in both LOS and NLOS setups. In this example, the variance of range, AoA, SNRFirst, or any other feature obtained from transceiver measurements or the CIRs of the wireless channels between the electronic device and the target device can be monitored to determine the various thresholds t1, t2, t3, t4.

The detection of the range and AoA measurements affects the subsequent tracking filter operation 520. For example, when the transceiver measurement quality is good, the tracking filter operation 520 fuses the range and AoA measurements of the output 518 with motion measurements 504 to provide smoother tracking and avoid sometimes erroneous transceiver measurements. In contrast, when the transceiver measurement quality is bad, the tracking filter operation 520 runs only on motion measurements 504 to temporarily provide target tracking until the transceiver measurement quality becomes good again.

Figure 7:
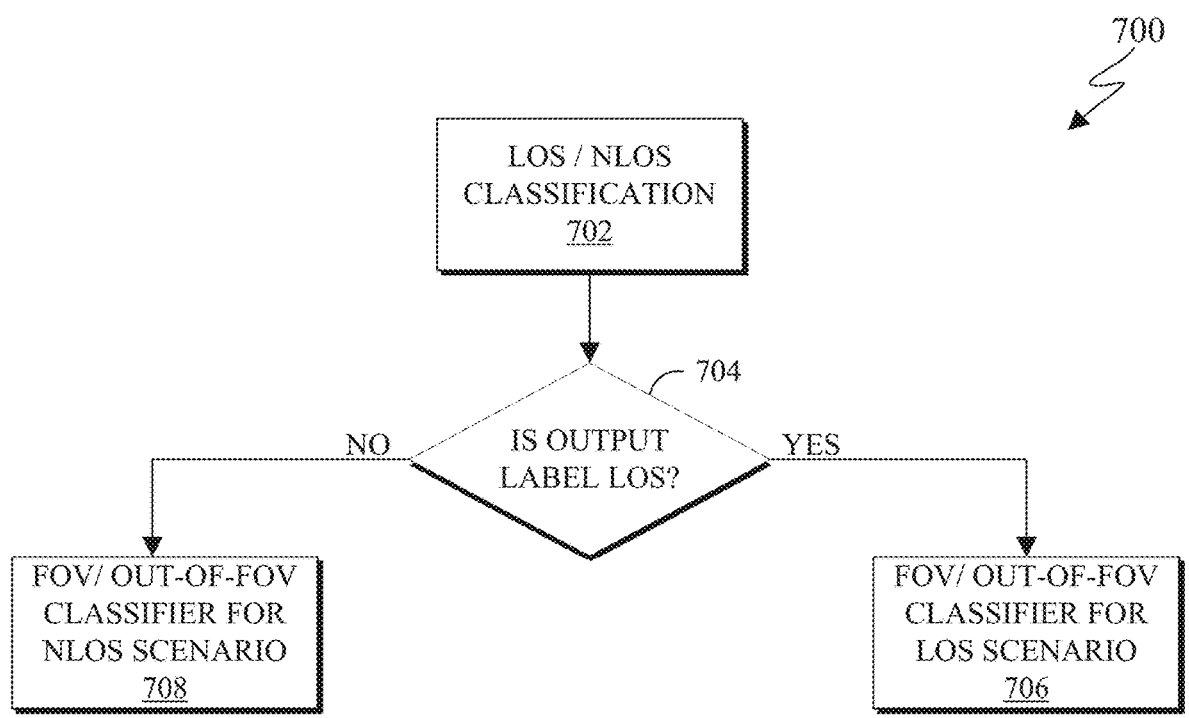
FIG. 7 illustrates example method for selecting a classifier for a transceiver based FoV detection operation according to embodiments of the present disclosure.

FIG. 7 illustrates example method 700 for selecting a classifier for the transceiver based FoV detector operation 512 according to embodiments of the present disclosure. The method 700 is described as implemented by any one of the client devices 106-114 or the server 104 of FIG. 1 and can include internal components similar to that of electronic device 200 of FIG. 2 and the electronic device 301 of FIG. 3. However, the method 700 as shown in FIG. 7 could be used with any other suitable electronic device and in any suitable system.

As illustrated in the method 700, a classifier of the transceiver based FoV detector operation 512 initially labels the scenario to be LOS or NLOS. Then another classifier of the transceiver based FoV detector operation 512 that is trained in that particular scenario labels the target to be in FoV or out-of-FoV. That is, as illustrated in the method 700, the transceiver based FoV detector operation 512 uses three different classifiers. The first classifier is for LOS/NLOS detection, the second classifier for FoV/out-of-FoV detection in LOS scenario and the third for FoV/out-of-FoV detection in NLOS scenario.

In step 702, a classifier of the transceiver based FoV detector operation 512 labels the target device as either in LOS or NLOS, based on the transceiver measurements 502. In step 704, the transceiver based FoV detector operation 512 determines whether the classifier in step 702, classified the target device is LOS. When the target device is classified as LOS, then in step 706, the transceiver based FoV detector operation 512 selects a classifier that is trained for LOS scenarios. The selected classifier of step 706 then determines whether the target device is in FoV or out of the FoV of the electronic device. Alternatively, when the target device is classified as NLOS, then in step 708, the transceiver based FoV detector operation 512 selects a classifier that is trained for NLOS scenarios. The selected classifier of step 708 then determines whether the target device is in FoV or out of the FoV of the electronic device.

Although FIG. 7 illustrates an example method, various changes may be made to FIG. 7. For example, while the method 700 is shown as a series of steps, various steps could overlap, occur in parallel, occur in a different order, or occur multiple times. In another example, steps may be omitted or replaced by other steps.

FIGS. 8A and 8B illustrate example moving average filter diagrams 800*a* and 800*b* for a transceiver based FoV detection operation according to embodiments of the present disclosure. In certain embodiments, the moving average filter diagrams 800*a* and 800*b* can be used by any one of the client devices 106-114 or the server 104 of FIG. 1.

As illustrated in FIG. 8A, the classifier output 802 represents a probability that the target device is within the FoV at different time intervals as determined by a classifier of the transceiver based FoV detector operation 512 (or the FoV decision consolidator 516). A sliding window moves along the classifier output 802 and averages the probability values within the window. For example, at a first time step, the sliding window 810*a* averages the first five the probability values and outputs the average in the mean output 804, as illustrated. At the second time step, the sliding window 810*b* moves one value to the right and averages the five the probability values and outputs the average in the mean output 804, as illustrated. This continues until sliding window 810*n* averages the final five probability values and outputs the average in the mean output 804, as illustrated. It is noted that in other embodiments, the sliding window can be different sizes.

Each value in the mean output 804 is then compared against a threshold value. If the average probability is greater than the threshold, then the transceiver based FoV detector operation 512 predicts that the output is in the FoV. Alternatively, if the average probability is less than the threshold, then the transceiver based FoV detector operation 512 predicts that the output is out of the FoV. As illustrated in FIG. 8A, the threshold is 0.5. For example, each value of the mean output 804 that is above 0.5, the output is the value of one, indicating that the target device is in the FoV of the electronic device.

As illustrated in FIG. 8B, the classifier output 820 represents the prediction of whether the target device at different time instances is in the FoV (as indicated by a value of one) or out of the FoV (as indicated by a value of negative one) of the electronic device. In certain embodiments, the classifier output 820 is the output 806 of FIG. 8A.

A sliding window moves along the classifier output 820 and averages the values within the window. For example, at a first time step, the sliding window 820*a* averages the first five the values and outputs the average in the majority voting output 830, as illustrated. At the second time step, the sliding window 810*b* moves one value to the right and averages the five the probability values and outputs the average in the majority voting output 830, as illustrated. This continues until sliding window 820*n* averages the final five probability values and outputs the average in the majority voting output 830, as illustrated. It is noted that in other embodiments, the sliding window can be different sizes.

FIGS. 9A, 9B, 9C, and 9D illustrate example signal processing diagrams 900*a*, 900*b*, 900*c*, and 900*d*, respectively for field of view determination according to embodiments of the present disclosure. In certain embodiments, the signal processing diagrams 900*a*, 900*b*, 900*c*, and 900*d* can be performed by any one of the client device 106-114 or the server 104 of FIG. 1 and can include internal components similar to that of electronic device 200 of FIG. 2 and the electronic device 301 of FIG. 3.

Figure 9A:
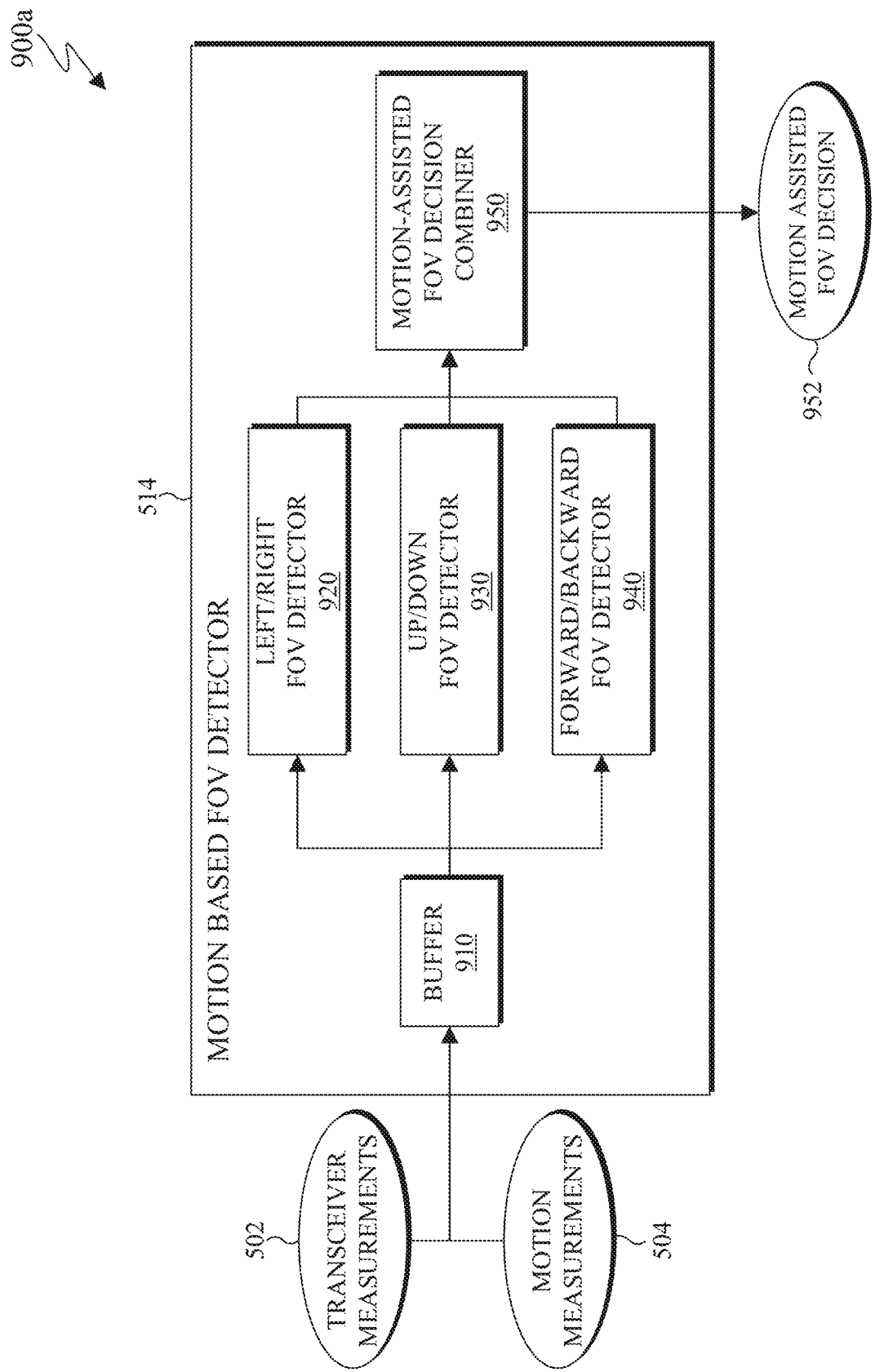
FIGS. 9A, 9B, 9C, and 9D illustrate example signal processing diagrams for field of view determination according to embodiments of the present disclosure.

As illustrated in FIG. 9A, the signal processing diagram 900*a* includes the motion based FoV detector operation 514 of FIG. 5, which receives the transceiver measurements 502 and the motion measurements 504 and generates a motion assisted FoV decision 952. The motion assisted FoV decision 952 is the output which is provided to the FoV decision consolidator 516 of FIG. 5.

The motion based FoV detector operation 514 includes a buffer 910, multiple motion based sub-detectors (such as the left/right FoV detector operation 920, the up/down FoV detector operation 930, and the forward/backward FoV detector operation 940), a motion assisted FoV decision combiner 950. The left/right FoV detector operation 920 is described in greater detail in FIG. 9B. The up/down FoV detector operation 930 is described in greater detail in FIG. 9C. The forward/backward FoV detector operation 940 is described in greater detail in FIG. 9D.

In certain embodiments, the motion based FoV detector operation 514 correlates values based various pairs for determining whether the target device in in FoV or out of FoV. For example, one pair could be based on changes in AoA of the horizontal plane to changes in azimuth orientation of the electronic device. For another example, another pair could be based on changes in AoA in a vertical plane to changes in elevation orientation of the electronic device. For yet another example, another pair could be based on changes in range between the electronic device and the target device to linear movement of the electronic device. For yet an additional example, another pair could be based on changes in range, AoA in both horizontal and vertical plans to changes in 3D relative position between the target device and the electronic device.

In certain embodiments, one or more of the multiple motion based sub-detectors are not active (or omitted) from the motion based FoV detector operation 514. For example, depending on the type of motions the electronic devices detect, the motion based FoV detector operation 514 can determine to not activate particular motion based sub-detectors.

In certain embodiments, the transceiver measurements 502 and the motion measurements 504 are from consecutive time instances are gathered into the buffer 910. The buffer 910 can represent multiple buffers for storing different measurements. The buffer 910 can be similar to the memory 260 of FIG. 2 and the memory 330 of FIG. 3. In certain embodiments, the buffer 910 includes sub buffers, where each sub buffer stores particular information, such as (i) a AoA (horizontal plane) buffer, (ii) an AoA (vertical plane) buffer, (iii) an azimuth angle buffer of the electronic device, (iv) a pitch (an elevation) angle buffer of the electronic device, (v) a linear acceleration buffer, (vi) a range buffer, and the like.

The motion based FoV detector operation 514 uses the measurements in the buffer 910 to precheck conditions for each of the multiple motion based sub-detectors (such as the left/right FoV detector operation 920, the up/down FoV detector operation 930, and the forward/backward FoV detector operation 940). For example, the motion based FoV detector operation 514 uses the measurements in the buffer 910 to determine whether the detected motion is sufficient for each of the sub-detectors to make individual decisions. For example, if the buffer 910 lacks AoA measurements in the horizontal plane, then the motion based FoV detector operation 514 determines to not use the left/right FoV detector operation 920. Similarly, if the buffer 910 lacks AoA measurements in the vertical plane, then the motion based FoV detector operation 514 determines to not use the up/down FoV detector operation 930. Similar determinations are done for each of the multiple motion based sub-detectors (such as the left/right FoV detector operation 920, the up/down FoV detector operation 930, and the forward/backward FoV detector operation 940).

The individual decisions from the sub-detectors (such as the left/right FoV detector operation 920, the up/down FoV detector operation 930, and the forward/backward FoV detector operation 940) are then combined at a motion assisted FoV decision combiner 950. The motion assisted FoV decision combiner 950 combines together the outputs of the individual motion based detectors (such as the left/right FoV detector operation 920, the up/down FoV detector operation 930, and the forward/backward FoV detector operation 940) and to identify a motion based location information. In certain embodiments, the motion assisted FoV decision combiner 950 determines the location information based on a statistical method such as majority voting or by comparing the average score with a threshold. The motion assisted FoV decision combiner 950 can also generate a confidence score associated with the indication of whether the target device is in FoV.

In certain embodiments, some or all from the sub-detectors (such as the left/right FoV detector operation 920, the up/down FoV detector operation 930, and the forward/backward FoV detector operation 940) can produce no decision due to the lack of detectable associated motion. In this case, the spatial consistency (such that the target device cannot jump from an in FoV state to out of FoV state without a continuous transition) is used to increase the usefulness of the output from each sub-detector. The in FoV/out of FoV decision (of a particular sub-detector) is set to be the same as the previous step if in the current step (the particular sub detector) produces no decision. For example, if the left/right FoV detector operation 920 generates no decision, then it outputs as its current decision (specifying whether the target device is in FoV/of out FoV) the previously determined decision.

If any of the sub-detectors (such as the left/right FoV detector operation 920, the up/down FoV detector operation 930, and the forward/backward FoV detector operation 940) is augmented with interpolation from its own decision history, then the motion based FoV detector operation 514 identifies the exception condition to avoid lettering any of the sub-detectors being stuck in the wrong state.

For example, the left/right FoV detector operation 920 performs a correlation between AoA measurements in horizontal plane and azimuth orientation readings. One exception for the left/right FoV detector operation 920 is if the variance of the buffer of recent elevation orientation readings are greater than a threshold, indicates that there is an up/down tilting motion.

For another example, the up/down FoV detector operation 930 performs a correlation between AoA measurements in vertical plane and elevation orientation readings. One exception for the up/down FoV detector operation 930 is if the variance of the buffer of recent azimuth orientation readings are greater than a threshold, indicates that there is a left/right movement.

For yet another example, the forward/backward FoV detector operation 940 performs a correlation between linear acceleration readings and range measurements. One exception for forward/backward FoV detector operation 940 is if the variance of the buffer of either elevation readings or azimuth readings are greater than a threshold, indicates that there is up/down tilting motion or left/right orientation movement.

When a motion condition is detected the corresponding motion-assisted FoV detector could go through exception handling procedure. The exception handling procedure can include clearing the buffers and resetting the detector state to "no decision." In certain embodiments, after the buffers of recent transceiver measurements 502 and recent motion measurements 504 are cleared, the sub detectors commence FoV decisions only after accumulating sufficient new measurements in the buffers.

Figure 9B:
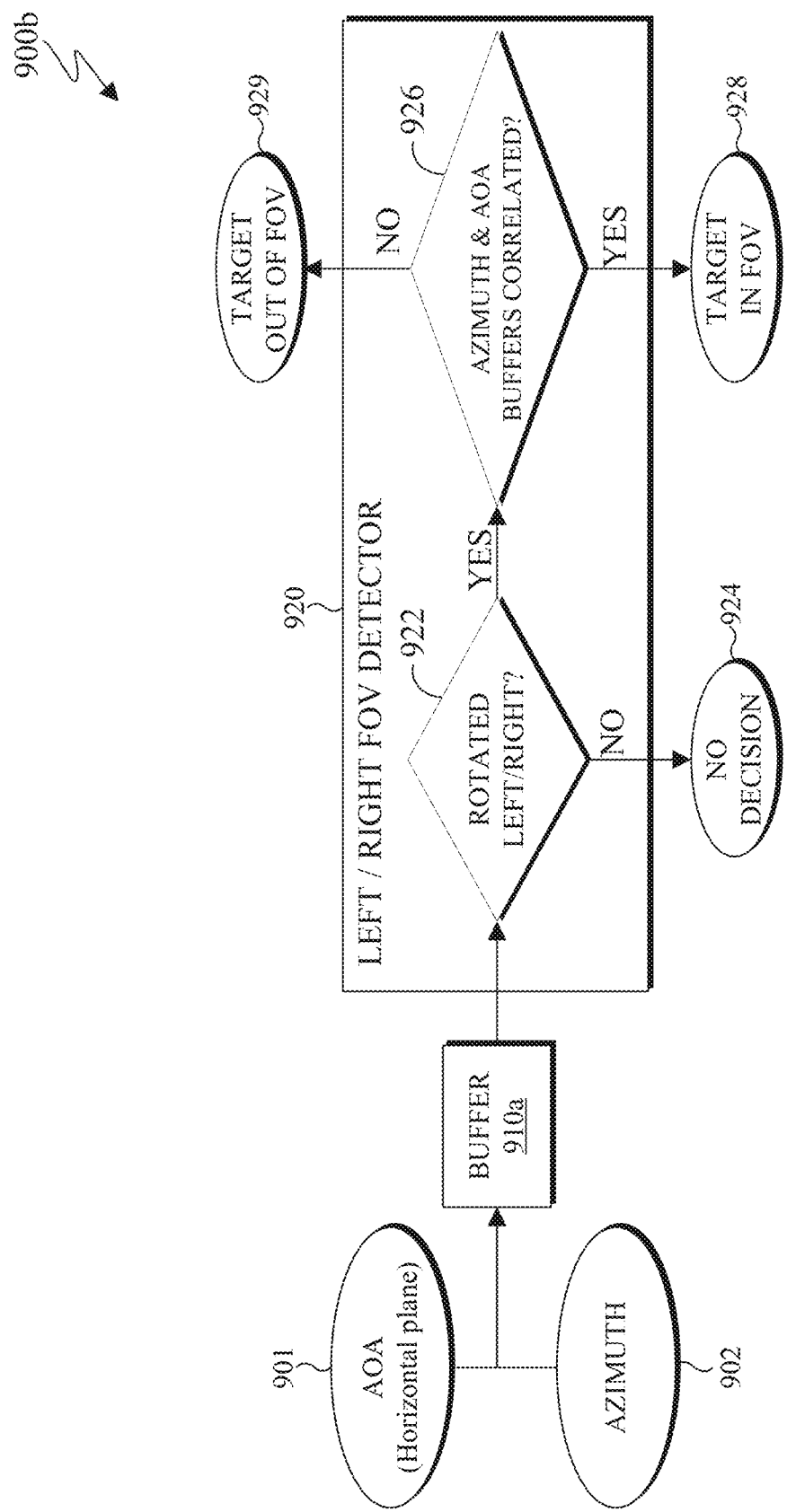

As illustrated in FIG. 9B, the signal processing diagram 900*b* illustrates the left/right FoV detector operation 920 of FIG. 9A. The left/right FoV detector operation 920 performs a correlation between azimuth orientation measurements 902 of the electronic device and AoA measurements in the horizontal plane measurements 901 toward the target device from the electronic device to determine if the target device is within the FoV of the electronic device.

The AoA in horizontal plane measurements 901 represents measurements from the X-Y plane shown in FIG. 4B and obtained from transceiver measurements 502. The azimuth orientation measurements 902 are obtained from the motion measurements 504. The AoA in horizontal plane measurements 901 and the azimuth orientation measurements 902 include measurements from consecutive time instances are accumulated into the buffer 910*a*. The buffer 910*a* can represent one or more sub buffers similar to the buffer 910 of FIG. 9A. In certain embodiments, the buffer 910*a* represents two buffers of similar sizes, where one buffer stores the AoA in horizontal plane measurements 901 and the other buffer stores the azimuth orientation measurements 902. In certain embodiments, the size of the buffer 910*a* is between five to ten samples at 10 Hz sampling rate.

In static positions, values in both AoA buffer and azimuth buffer stay roughly constant, random noise in these two buffers make a correlation value between them unrepresentative of the linear correlation relationship between them. Therefore, in step 922 the left/right FoV detector operation 920 determines whether the electronic device is rotated in a left direction or a right direction. For example, the left/right FoV detector operation 920 determines that the device is rotated in a left direction or a right direction based on whether the variance of the azimuth buffer is greater than a first threshold. Alternatively the left/right FoV detector operation 920 determines that the device is rotated in left or right direction based on whether linear acceleration in left or right direction of the electronic device is greater than a second threshold. Upon determining that variance of the azimuth buffer is less than the first threshold or upon determining that the linear acceleration in left or right direction of the electronic device is less than the second threshold, the left/right FoV detector operation 920 generates no decision 924. Upon generating the no decision 924, indicates that the left/right FoV detector operation 920 determines that the electronic device is not rotated in either a left direction or a right direction. as such, the left/right FoV detector operation 920 cannot determine whether the target device in in FoV or out of Fov.

Alternatively, upon determining that variance of the azimuth buffer is greater than the first threshold or upon determining that the linear acceleration in left or right direction of the electronic device is greater than the second threshold, the left/right FoV detector operation 920 the correlates the azimuth orientation measurements 902 and AoA in horizontal plane measurements 901 to determine whether the target device is in the FoV.

In certain embodiments, the correlation value can be the Pearson correlation coefficient, which measures linear correlation, between the azimuth orientation measurements 902 and AoA in horizontal plane measurements 901 that are stored in the buffer 910*a*. A value of positive one is total positive linear correlation. A value of zero indicates no linear correlation. A value of negative one is total negative linear correlation. If the Pearson correlation coefficient is greater than a defined threshold, then in step 926, the left/right FoV detector operation 920 determines target device is in FoV 928. Alternatively, if the Pearson correlation coefficient is less than the threshold, then in step 926, the left/right FoV detector operation 920 determines target device is out of FoV 929.

In certain embodiments, the correlation value can be the variance of the difference between the AoA in horizontal plane measurements 901 that are stored in the buffer 910*a* and the azimuth orientation measurements 902 that are stored in the buffer 910*a*. A smaller variance signifies highly correlated AoA and azimuth buffers. When the variance is smaller than a threshold, the left/right FoV detector operation 920 determines target device is in FoV 928. Alternatively, when the variance is larger than the threshold, the left/right FoV detector operation 920 determines target device is out of FoV 929.

Figure 9C:
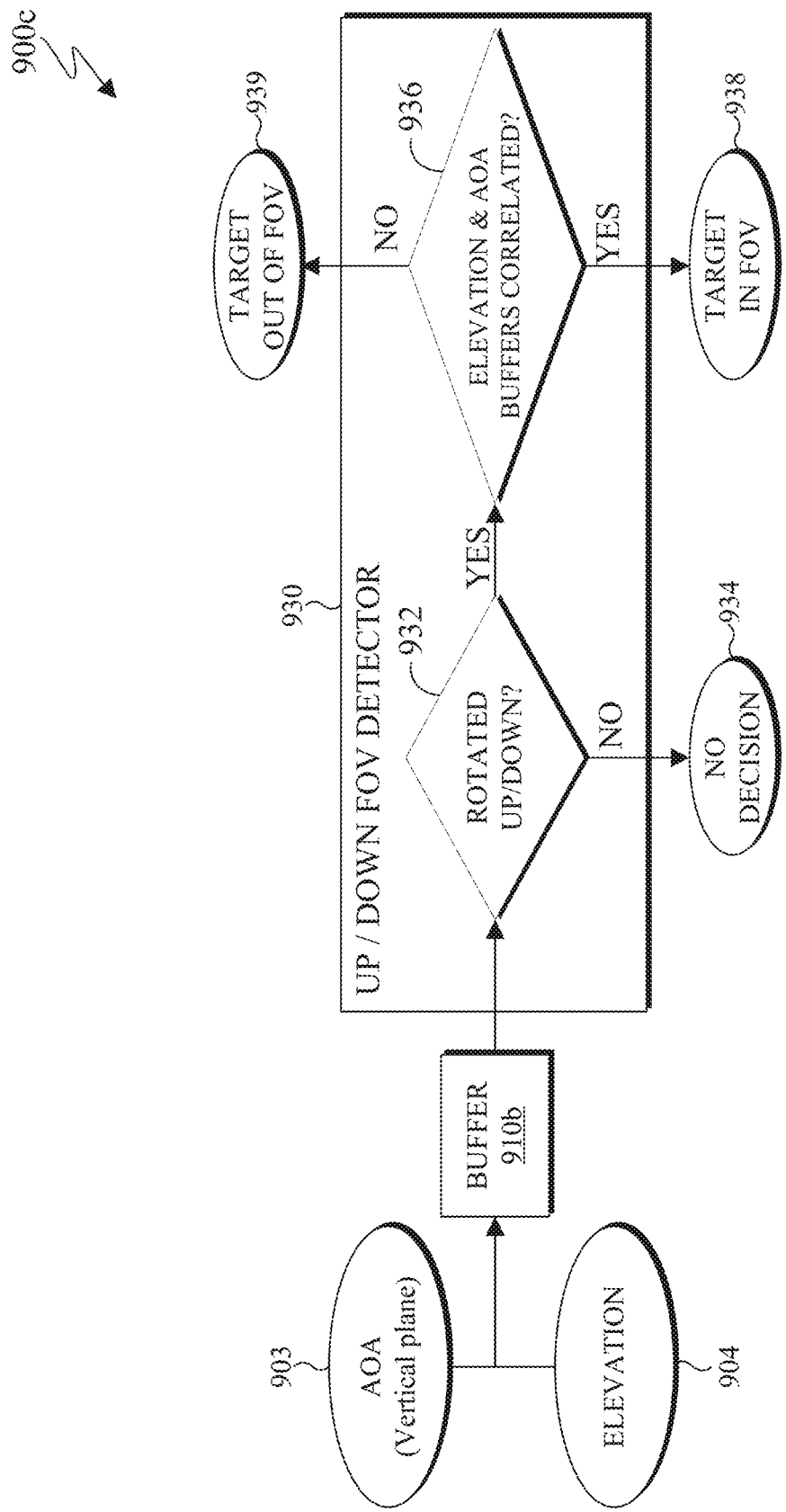

As illustrated in FIG. 9C, the signal processing diagram 900c illustrates the up/down FoV detector operation 930 of FIG. 9A. The up/down FoV detector operation 930 performs a correlation between the elevation orientation measurements 904 of the electronic device and AoA measurements in the vertical plane toward the target device from the electronic device to determine if the target device is within the FoV of the electronic device.

The AoA in vertical plane measurements 903 represents measurements from the X-Z plane or Y-Z plane shown in FIG. 4B and obtained from transceiver measurements 502. The elevation orientation measurements 904 are obtained from the motion measurements 504. The AoA in vertical plane measurements 903 and the elevation orientation measurements 904 include measurements from consecutive time instances are accumulated into the buffer 910b. The buffer 910b can represent one or more sub buffers similar to the buffer 910 of FIG. 9A. In certain embodiments, the buffer 910b represents two buffers of similar sizes, where one buffer stores the AoA in vertical plane measurements 903 and the other buffer stores the elevation orientation measurements 904. In certain embodiments, the size of the buffer 910b is between five to ten samples at 10 Hz sampling rate.

In static positions, values in both AoA buffer and elevation buffer stay roughly constant, random noise in these two buffers make a correlation value between them unrepresentative of the linear correlation relationship between them. Therefore, in step 932 the up/down FoV detector operation 930 determines whether the electronic device is rotated in an up direction or down direction. For example, the up/down FoV detector operation 930 determines that the device is rotated in an up direction or down direction based on whether the variance of the elevation buffer is greater than a first threshold. Alternatively the up/down FoV detector operation 930 determines that the device is rotated in up direction or down direction based on whether linear acceleration in up direction or down direction of the electronic device is greater than a second threshold. Upon determining that variance of the elevation buffer is less than the first threshold or upon determining that the linear acceleration in up direction or down direction of the electronic device is less than the second threshold, the up/down FoV detector operation 930 generates no decision 934. Upon generating the no decision 934, indicates that the up/down FoV detector operation 930 determines that the electronic device is not rotated in either a up direction or down direction. as such, the up/down FoV detector operation 930 cannot determine whether the target device in in FoV or out of Fov.

Alternatively, upon determining that variance of the elevation buffer is greater than the first threshold or upon determining that the linear acceleration in up or down direction of the electronic device is greater than the second threshold, the up/down FoV detector operation 930 the correlates the elevation orientation measurements 904 and AoA in vertical plane measurements 903 to determine whether the target device is in the FoV.

In certain embodiments, the correlation value can be the Pearson correlation coefficient, which measures linear correlation, between the elevation orientation measurements 904 and AoA in vertical plane measurements 903 that are stored in the buffer 910b. A value of positive one is total positive linear correlation. A value of zero indicates no linear correlation. A value of negative one is total negative linear correlation. The up/down FoV detector operation 930 compares the correlation value with a defined threshold in step 936 to determine whether the target device in in FoV or out of FoV. For example, if the Pearson correlation coefficient is greater than a threshold, then in step 936, the up/down FoV detector operation 930 determines target device is in FoV 938. Alternatively, if the Pearson correlation coefficient is less than the threshold, then in step 936, the up/down FoV detector operation 930 determines target device is out of FoV 939.

In certain embodiments, the correlation value can be the variance of the difference between the AoA in vertical plane measurements 903 that are stored in the buffer 910b and the elevation orientation measurements 904 that are stored in the buffer 910b. A smaller variance signifies highly correlated AoA (in the vertical plan) and elevation buffers. When the variance is smaller than a threshold, the up/down FoV detector operation 930 determines target device is in FoV 938. Alternatively, when the variance is larger than the threshold, the up/down FoV detector operation 930 determines target device is out of FoV 939.

Figure 9D:
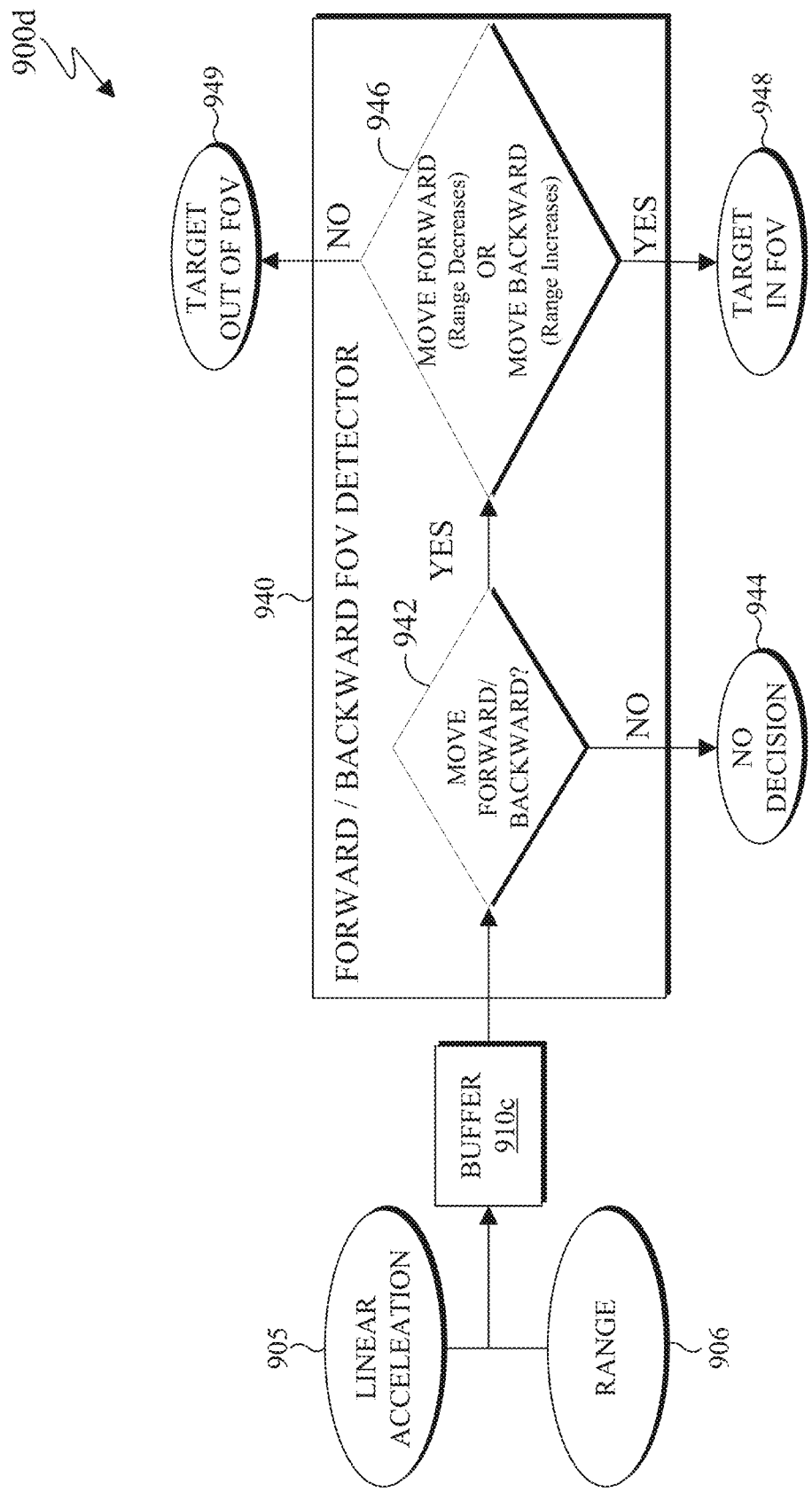

As illustrated in FIG. 9D, the signal processing diagram 900d illustrates the forward/backward FoV detector operation 940 of FIG. 9A. The forward/backward FoV detector operation 940 performs a correlation between the range 906 (the distance between the electronic device and the target device) and the linear acceleration 905 (movement) determine if the target device is within the FoV of the electronic device.

The linear acceleration 905 is obtained from the motion measurements 504. The range 906 is obtained from transceiver measurements 502.

The linear acceleration 905 and the range 906 include measurements from consecutive time instances are accumulated into the buffer 910c. The buffer 910c can represent one or more sub buffers similar to the buffer 910 of FIG. 9A. In certain embodiments, the buffer 910c represents two buffers of similar sizes, where one buffer stores linear acceleration 905 measurements and the other buffer stores the range 906 measurements. In certain embodiments, the size of the buffer 910c is between five to ten samples at 10 Hz sampling rate.

If the electronic device is held with a display screen facing a user (such as when a user is viewing a smart phone) the axis direction of the motion sensors would coincide with movement of the user.

The buffer 910c that includes the linear acceleration 905 measurements for indicating whether the electronic device is stationary or whether user moves the electronic device in a forward direction or in a backward direction. The forward/backward FoV detector operation 940 determines that the device is moved in a forward direction or backward direction based on the values of the linear acceleration 905 that is stored in the buffer 910c. In step 942, the forward/backward FoV detector operation 940 compares variances of the linear acceleration 905 that is stored in the buffer 910c to a threshold. If the variances of the linear acceleration 905 are below the threshold, then the forward/backward FoV detector operation 940 generates no decision 944. Generating no decision 944, indicates that the electronic device is not being moved in a forward direction or a backward direction.

Alternatively, upon determining that variance of the linear acceleration 905 is above a threshold, the forward/backward FoV detector operation 940 in step 946, determines whether (i) the range 906 decreases and the electronic device moves forward or (ii) range 906 increases and the electronic device moves backward. The forward/backward FoV detector operation 940 determines that the target device is in FoV 948 if range 906 decreases and the electronic device moves forward or (ii) range 906 increases and the electronic device moves backward. Alternatively, if either condition is not satisfied, the forward/backward FoV detector operation 940 determines that the target device is out of FoV 949.

Figure 10A:
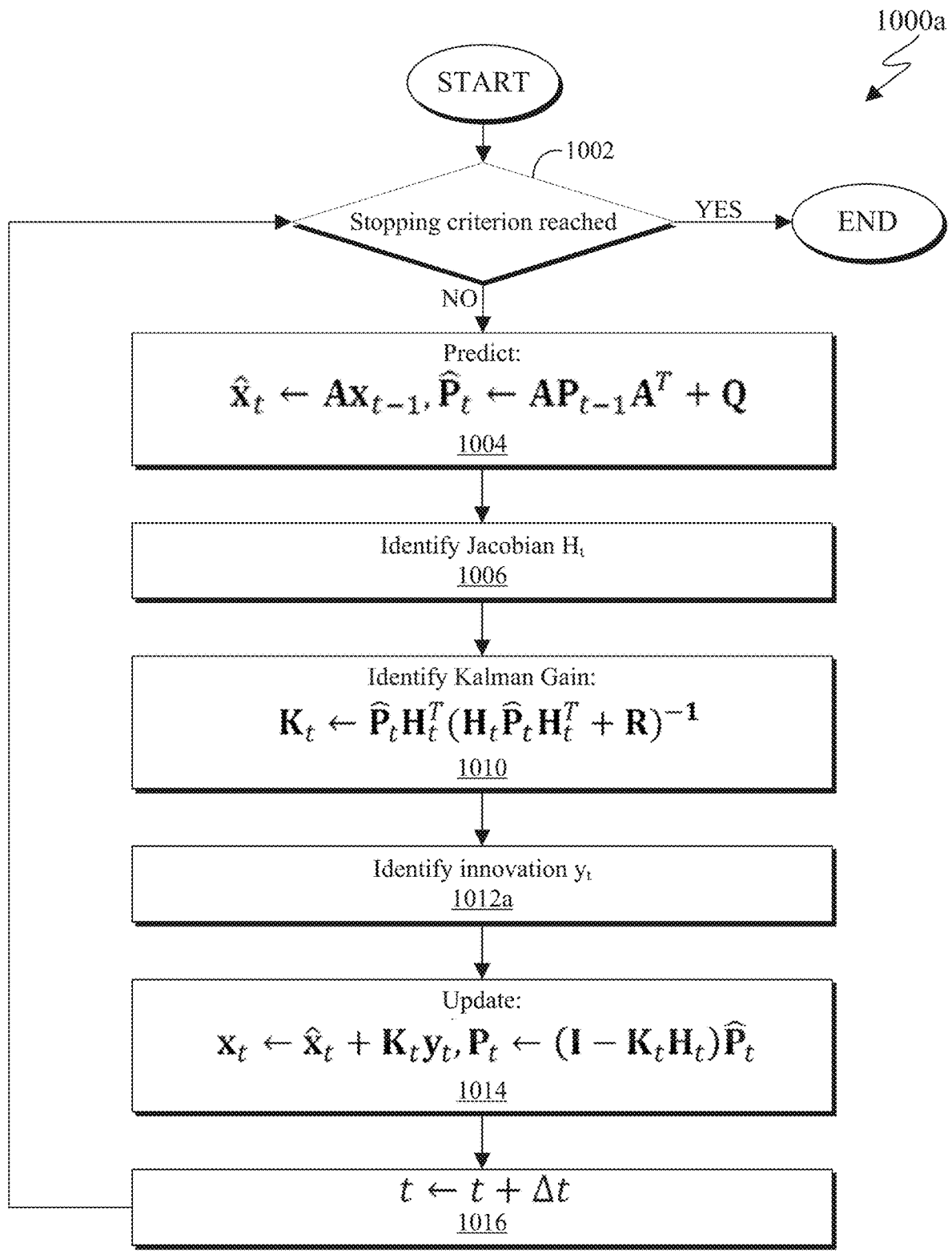
FIGS. 10A and 10B illustrate example methods for various tracking filter operations according to embodiments of the present disclosure.
Figure 10B:
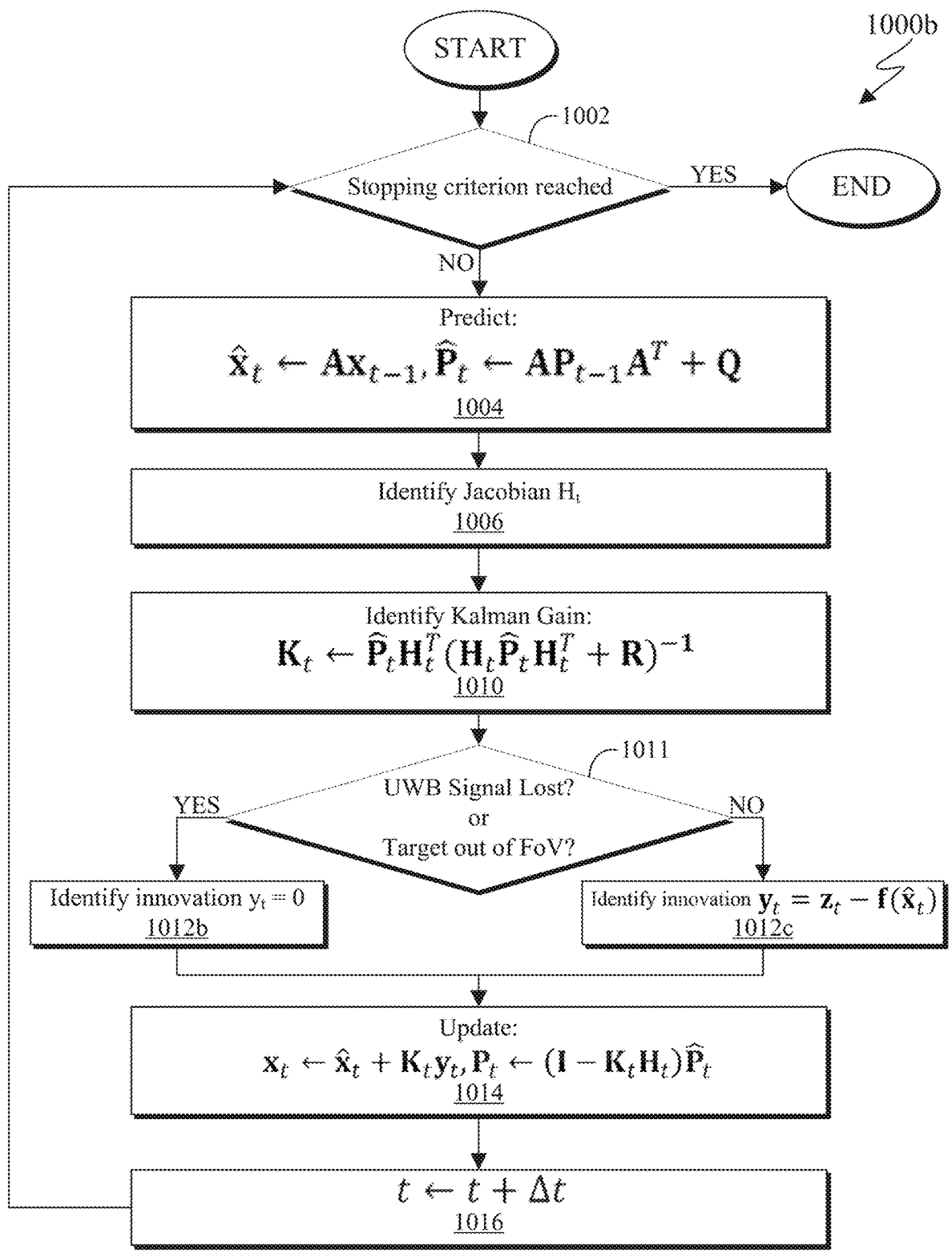

FIGS. 10A and 10B illustrate example methods 1000a and 1000b, respectively, for various tracking filter operations according to embodiments of the present disclosure. The methods 1000a and 1000b are described as implemented by any one of the client devices 106-114 or the server 104 of FIG. 1 and can include internal components similar to that of electronic device 200 of FIG. 2 and the electronic device 301 of FIG. 3. However, the methods 1000a and 1000b as shown in FIGS. 10A and 10B, respectively, could be used with any other suitable electronic device and in any suitable system.

As described above, signal processing diagram 500 of FIG. 5 includes the tracking filter operation 520. The tracking filter operation 520 can be used to track the 3D coordinates of the target device. The range and AoA measurements from the output 518 are used as the input to the tracking filter operation 520. In certain instances, the FoV decision from the output 518 can also be used by the tracking filter operation 520 (such as when an out-of-FoV decision is made, when there is loss of transceiver measurements 102, and the like).

The tracking filter improves the quality of measurements. Example tracking filters include Kalman Filter, Extended Kalman Filter (EKF), EKF with adaptive values, a particle filter, and the like. In certain embodiments, orientation information (from the motion measurements 504) are used along with the transceiver measurements 502 to track AoA using an EKF in the tracking filter operation 520.

In certain embodiments, EKF is used to track UWB measurements. The state vector is defined in Equation (18), below. In Equation (18), $x_t$, $y_t$, $z_t$ are the position of the electronic device with respect to the target device, in three-dimensions. The observation or the measurements for EKF are erroneous range, AoA azimuth, and AoA elevation obtained from UWB measurements. For example, the observation of Equation (19) is dependent on the interface and design choice. For example, the observation could correspond to UWB measurements of range, AoA Azimuth, and AoA elevation, as defined in Equation (20), below. Functions for mapping the measurements and the state can be defined in Equation (21), Equation (22), and Equation (23), below.

$$x_t = [x_t, y_t, z_t]^T \tag{18}$$

$$z_t = f(x_t). \tag{19}$$

$$z_t = [r_t, az_t, el_t]^T \tag{20}$$

$$r_t = \sqrt{x_t^2 + y_t^2 + z_t^2} \tag{21}$$

$$az_t = a\tan\left(\frac{x_t}{y_t}\right) \tag{22}$$

$$el_t = \left(\frac{z_t}{\sqrt{x_t^2 + y_t^2}}\right) \tag{23}$$

Reference can be made to the coordinate system 420 of FIG. 4B. When the observation is defined as in Equation (20), then the mapping function between the measurements and the state is defined in Equation (21), Equation (24), and Equation (25).

$$\theta_t = 90 - az_t = a\tan\left(\frac{y_t}{x_t}\right) \tag{24}$$

$$\varphi_t = 90 - el_t = a\tan\left(\frac{\sqrt{x_t^2 + y_t^2}}{z_t}\right) \tag{25}$$

The state transition equation is defined in Equation (26), below. The state transition equation (26) is defined as the rotation matrix obtained from the orientation.

$$x_t = Ax_{t-1} + w_t \tag{26}$$

To account for imperfections in the motion model, Q, which represents the process noise covariance, can be tuned based on the real data. If P represents the error covariance matrix, R represents the measurement noise covariance matrix, and K represents the Kalman Gain, then R (the measurement noise covariance matrix) is determined using real data or measurements. One way to determine R is by obtaining measurements in the scenario where ground truth is known and calculating the variance of the difference between the measurements and ground truth. A Jacobian Matrix is described in Equation (27), below. The tracking filter operation 520 is initialized by identifying the state of Equation (18), from the current measurements.

To account for imperfections in the motion model, Q, which represents the process noise covariance, can be tuned based on the real data. If P represents the error covariance matrix, R represents the measurement noise covariance matrix, and K represents the Kalman Gain, then R (the measurement noise covariance matrix) is determined using real data or measurements. One way to determine R is by obtaining measurements in the scenario where ground truth is known and calculating the variance of the difference between the measurements and ground truth. A Jacobian Matrix is described in Equation (27), below. Alternatively, if the measurements are $r_t$, $az_t$, $el_t$, then the Jacobian Matrix, is described in Equation (28). The Jacobian as is described in Equation (29), below, describes the mapping function between the measurements and state. The filter is initialized by calculating the state $[x_0, y_0, z_0]^T$ (Equation (18), above) from the current measurements $[r_0, \theta_0, \varphi_0]^T$ (Equation (20), above) using the mapping function between them and the error covariance matrix is initialized to identity matrix. The Jacobian Matrix can be used to calculate K, the Kalman Gain.

$$H(i, j) = \frac{\partial f(x_t)_i}{\partial x_j} \begin{bmatrix} \frac{\partial r_t}{\partial x_t} & \frac{\partial r_t}{\partial y_t} & \frac{\partial r_t}{\partial z_t} \\ \frac{\partial \theta_t}{\partial x_t} & \frac{\partial \theta_t}{\partial y_t} & \frac{\partial \theta_t}{\partial z_t} \\ \frac{\partial \varphi_t}{\partial x_t} & \frac{\partial \varphi_t}{\partial y_t} & \frac{\partial \varphi_t}{\partial z_t} \end{bmatrix} \tag{27}$$

$$H(i, j) = \frac{\partial f(x_t)_i}{\partial x_j} \begin{bmatrix} \frac{\partial r_t}{\partial x_t} & \frac{\partial r_t}{\partial y_t} & \frac{\partial r_t}{\partial z_t} \\ \frac{\partial az_t}{\partial x_t} & \frac{\partial az_t}{\partial y_t} & \frac{\partial az_t}{\partial z_t} \\ \frac{\partial el_t}{\partial x_t} & \frac{\partial el_t}{\partial y_t} & \frac{\partial el_t}{\partial z_t} \end{bmatrix} \tag{28}$$

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{-y_t}{x_t^2+y_t^2} & \frac{x_t}{x_t^2+y_t^2} & 0 \\ \frac{z_t x_t}{(x_t^2+y_t^2+z_t^2)\sqrt{x_t^2+y_t^2}} & \frac{z_t y_t}{(x_t^2+y_t^2+z_t^2)\sqrt{x_t^2+y_t^2}} & \frac{-\sqrt{x_t^2+y_t^2}}{(x_t^2+y_t^2+z_t^2)} \end{bmatrix} \quad (28)$$

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{y_t}{x_t^2+y_t^2} & \frac{-x_t}{x_t^2+y_t^2} & 0 \\ \frac{-z_t x_t}{(x_t^2+y_t^2+z_t^2)\sqrt{x_t^2+y_t^2}} & \frac{-z_t y_t}{(x_t^2+y_t^2+z_t^2)\sqrt{x_t^2+y_t^2}} & \frac{\sqrt{x_t^2+y_t^2}}{(x_t^2+y_t^2+z_t^2)} \end{bmatrix} \quad (29)$$

As illustrated in the FIG. 10A, the method 1000a describes an Extended Kalman Filter for tracking range and AoA measurements. In step 1002 the tracking filter operation 520 determines whether a stopping criteria is reached. The stopping criteria can be based on whether a new measurement was received. For example, as long as a new measurement is received the stopping criteria is not reached.

Upon determining that the stopping criteria is not reached, in step 1004, the tracking filter operation 530 performs a prediction on the state, $\hat{x}$, as shown in Equation (30) and a prediction on the error covariance matrix, $\hat{P}$, as shown in Equation (31).

$$\hat{x}_t = A x_{t-1} \quad (30)$$

$$\hat{P}_t = A P_{t-1} A^T + Q \quad (31)$$

In step 1006, the tracking filter operation 530 identifies the Jacobian Matrix as described above in Equations (27)-(29). In step 1010, the tracking filter operation 530 uses the Jacobian Matrix (of step 1006) to identify the Kalman Gain, as describe in Equation (32), below.

$$K_t = \hat{P}_t H_t^T (H_t \hat{P}_t H_t^T + R)^{-1} \quad (32)$$

In step 1012a, the tracking filter operation 530 identifies the innovation, $y_t$, as shown in Equation (33), below. The innovation is the difference between the measured value and the predicted value.

$$y_t = z_t - f(\hat{x}_t) = \begin{bmatrix} r_t \\ az_t \\ el_t \end{bmatrix} - \begin{bmatrix} \sqrt{\hat{x}_t^2+\hat{y}_t^2+\hat{z}_t^2} \\ \mathrm{atan}\left(\frac{\hat{x}_t}{\hat{y}_t}\right) \\ \mathrm{atan}\left(\frac{\hat{z}_t}{\sqrt{\hat{x}_t^2+\hat{y}_t^2}}\right) \end{bmatrix} \quad (33)$$

In step 1014, the tracking filter operation 530 updates the state, as shown in Equation (34) and the error covariance matrix, as shown in Equation (35). In step 1016, the tracking filter operation 530 increases the time and returns to step 1002. For example, the value for $\Delta t$ is from the update frequency of the UWB measurements from underlying UWB chipset and firmware (such as every 0.1 seconds). The expression t+$\Delta t$ denotes that the EKF goes to processing the next measurement. The stopping criterion of step 1002 is reached when there are no further measurements to process.

$$x_t = \hat{x}_t + K_t y_t \quad (34)$$

$$P_t = (I - K_t H_t) \hat{P}_t \quad (35)$$

In certain embodiments, during a NLOS scenarios the UWB measurements between the electronic device and the target device can get lost (such that the electronic device does not obtain the signals from the target device). In LOS scenarios, transceiver measurements 502 are reported periodically from underlying firmware. However, in NLOS scenarios, the transceiver measurements 502 are not obtained from the underlying firmware at some time instances. In certain embodiments, the tracking filter operation 520 determines if there is a measurement loss depending on whether or not transceiver measurement 502 were reported by the underlying firmware at the expected time instance. In other cases, when the target device is out of FoV of the electronic device (such as when the target device is behind a user), even though there are UWB measurements, the AoA values can be misleading due to unstable calculation based on weak UWB signals. To deal with these scenarios, one embodiment relies on orientation change of the electronic device obtained from a motion sensor to temporarily track the AoA and range. When there are no UWB measurements, the tracking filter operation 530 can change the innovation term to zero.

As illustrated in FIG. 10B, the method 1000b describes tracking with partial measurement loss. In step 1002, tracking filter operation 530 determines whether a stopping criteria is reached. Upon determining that the stopping criteria is not reached, in step 1004, the tracking filter operation 530 performs a perdition on the state, $\hat{x}$, as shown in Equation (30) and performs a perdition on the error covariance matrix, $\hat{P}$, as shown in Equation (31). In step 1006, the tracking filter operation 530 identifies the Jacobian Matrix as described above in Equations (27)-(29). In step 1010, the tracking filter operation 530 uses the calculated Jacobian Matrix (of step 1006) to identifies the Kalman Gain, as describe in Equation (32). In step 1011 the tracking filter operation 530 determines whether the UWB measurements were lost (or not obtained) or whether the target was identified as being out of FOV (e.g., by the FOV detector 510 of FIG. 5). If the UWB measurements were lost or if the target was identified as being out of FOV, then in step 1012b, the tracking filter operation 530 sets the innovation value, $y_t$, to zero. Alternatively, if the UWB measurements were received (not lost) and if the target was identified as being in FOV, then in step 1012c, the tracking filter operation 530 identifies the innovation, $y_t$, as shown in Equation (33). As discussed above, the innovation value, $y_t$, is the difference between the measured value and the predicted value. In step 1014, the tracking filter operation 530 updates the state, as shown in Equation (34) and the error covariance matrix, as shown in Equation (35). In step 1016, the tracking filter operation 530 increases the time and returns to step 1002.

Although FIGS. 10A and 10B illustrate example processes, various changes may be made to FIGS. 10A and 10B. For example, while the method 1000a is shown as a series of steps, various steps could overlap, occur in parallel, occur in a different order, or occur multiple times. In another example, steps may be omitted or replaced by other steps.

Figure 11:
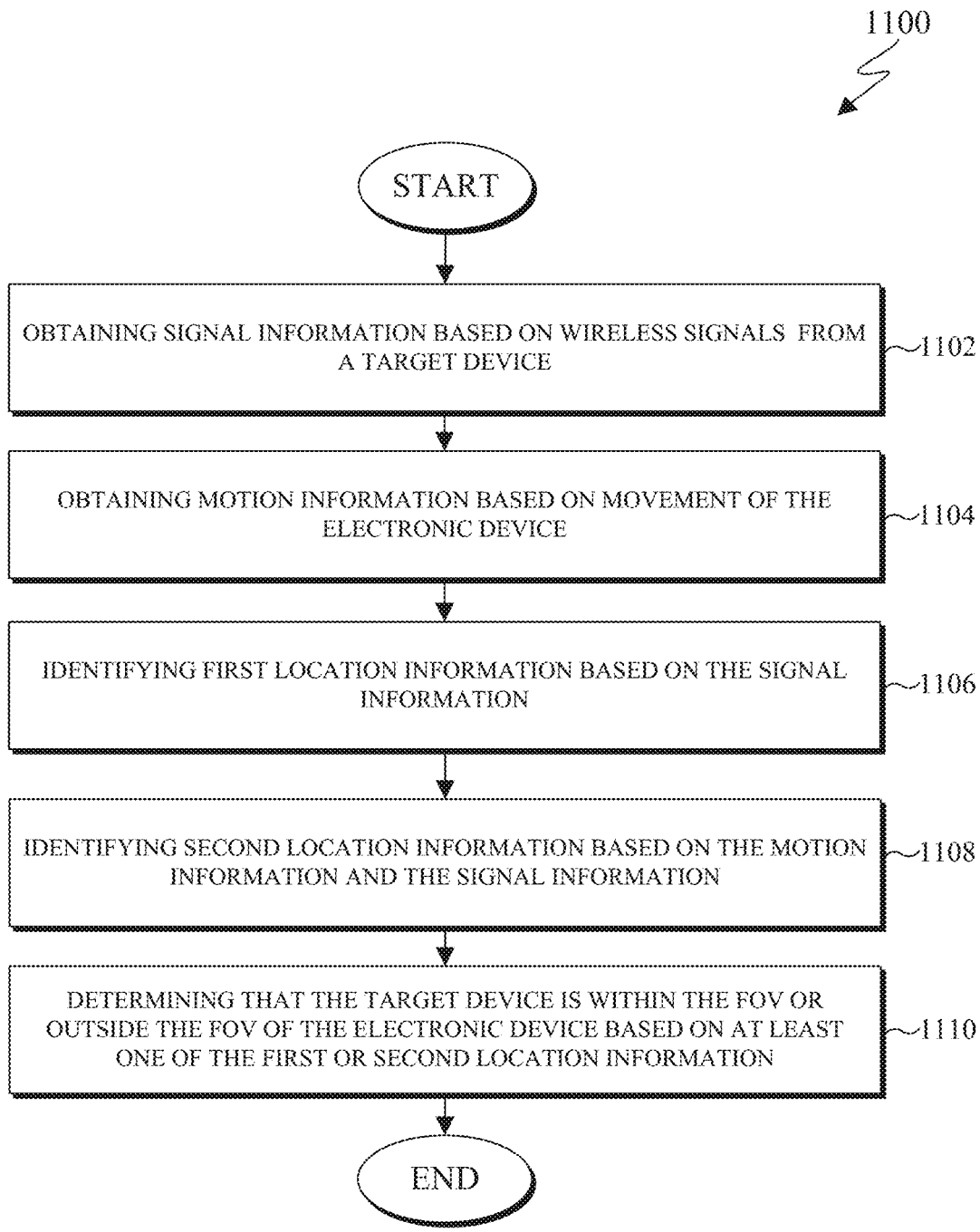
FIG. 11 illustrates an example method for FoV determination according to embodiments of the present disclosure.

FIG. 11 illustrates an example method for FoV determination according to embodiments of the present disclosure. The method 1100 is described as implemented by any one of the client device 106-114 of FIG. 1 or the server 104 of FIG. 1 and can include internal components similar to that of electronic device 200 of FIG. 2 and the electronic device 301 of FIG. 3. However, the method 1100 as shown in FIG. 11 could be used with any other suitable electronic device and in any suitable system.

In step 1102, the electronic device, obtains channel information, range information, and AoA information based on wireless signals communicated between an electronic device and an external electronic device (such as a target device). In certain embodiments, the electronic device includes a transceiver that obtains signals directly from the target device. In other embodiments, an electronic device, such as the server 104 of FIG. 1 obtains information associated with signals that are communicated between an electronic device and an external electronic device.

In certain embodiments, the channel information includes features of a CIR of a wireless channel between the electronic device and the external electronic device. For example, the features of the CIR can include a first peak strength of the CIR. The features of the CIR can also include a strongest peak strength of the CIR. The features of the CIR further include an amplitude difference between the first peak strength and the strongest peak strength of the CIR. Additionally, the features of the CIR can include a RSSI value. The features of the CIR can also include a variance of the first peak strength of the CIR over a time interval. The features of the CIR can further include a time difference between the first peak strength of the CIR and the strongest peak strength of the CIR.

In certain embodiments, range information includes the range measurement obtained based on the wireless signals. The range information can also include a variances of the range measurement over a time interval.

In certain embodiments, the AoA information includes AoA measurement obtained based on the wireless signals. The AoA information can also include variances of the AoA measurement over a time interval.

In step 1104, the electronic device obtains motion information based on movements of the electronic device. For example, the motion information can be from an IMU sensor such as an accelerometer, gyroscope, magnetometer, and the like. In certain embodiments, the electronic device includes a one or more motion sensors that obtains and measure motion of the electronic device. In other embodiments, a remote device, such as the server 104 of FIG. 1 obtains the motion information from the electronic device.

In step 1106, the electronic device identifies first location information based on the signal information. The first location information indicates whether the target device is within a FoV of the electronic device. The first location information can be based on the channel information, the range information, the AoA information, or any combination thereof. In certain embodiments, the first location information includes an indication of whether the external electronic device is within the FoV or outside the FoV of the electronic device. In certain embodiments, the first location information is based on SVM operating on the features of the CIR and at least one of the range information or the AoA information. A gaussian kernel can also be used to indicate whether the target is in or out of FoV using the feature vector.

In certain embodiments, the electronic device applies a moving average filter within a sliding window to the first location information to generate an average probability of being within the FoV. The electronic device then compares the average probability of being within the FoV within the sliding window to a threshold. Thereafter, the electronic device can revise the first location information of the presence of the external electronic device relative to the FoV of the electronic device based on the comparison to remove outliers.

In step 1108, the electronic device identifies second location information based on the motion information and the signal information. The second location information indicating whether the target device is within the FoV of the electronic device. To identify the second location information, the electronic device identifies, at different instances in time, AoA and range information between the target device and the electronic device based on the signal information obtained in step 1102. Additionally, to identify the second location information, the electronic device identifies, at different instances in time, azimuth angles, elevation angles, and linear acceleration, based on the motion information obtained in step 1104.

The electronic device can compare changes in the AoA in a horizontal plane to changes in the azimuth angles of the electronic device for determining a first indication that the target device is within the FoV or outside the FoV of the electronic device. The electronic device can also compare changes in the AoA in a vertical plane to changes in the elevation angles of the electronic device for determining a second indication that the target device is within the FoV or outside the FoV of the electronic device. The electronic device can further compare changes the range information to changes in the linear acceleration for determining a third indication that the target device is within the FoV or outside the FoV of the electronic device. The electronic device is able to identify the second location information based on the first indication, the second indication, and the third indication.

In certain embodiments, the electronic device uses the left/right FoV detector operation 920 for comparing changes in the AoA in the horizontal plane to changes in the azimuth angles of the electronic device for determining that the target device is within the FoV of the electronic device. The electronic device determines whether the electronic device is rotated in a left direction or a right direction. To determine whether a leftward or rightward rotation occurred, the electronic device compares either the linear acceleration in a horizontal direction to a first threshold or a variances in the azimuth angles to a second threshold. In response to determining that the electronic device is rotated in the left direction or the right direction, the electronic device identifies a correlation between the AoA in the horizontal plane and the azimuth angles. The correlation can be based on differences between the AoA in the horizontal plane and the azimuth angles. Then electronic device then determines that the target device is within the FoV of the electronic device based on a comparison of the correlation to a third threshold.

In certain embodiments, the electronic device uses a up/down FoV detector operation 930 for comparing changes in the AoA in the vertical plane to changes in the elevation angles of the electronic device for determining that the target device is within the FoV of the electronic device. The electronic device determines whether the electronic device is rotated in an upwards direction or a downwards direction. To determine whether an upward or downward rotation occurred, the electronic device compares either the linear acceleration in a vertical direction to a first threshold or variances in the elevation angles to a second threshold. In response to determining that the electronic device is rotated in the upwards direction or the downwards direction, the electronic devices identifies a correlation between the AoA in the vertical plane and the elevation angles. The correlation can be based on differences between the AoA in the vertical plane and the elevation angles. Then electronic device then determines that the target device is within the FoV of the electronic device based on a comparison of the correlation to a third threshold.

In certain embodiments, the electronic device uses a forward/backward FoV detector operation 940 for comparing the range information to changes in the linear acceleration for determining that the target device is within the FoV of the electronic device. electronic device determines whether the electronic device is moved in a forward direction or in a backwards direction. To determine whether movement in the forward direction or in the backwards direction, occurred is based on whether linear acceleration in the corresponding direction is detected. In response to determining that the electronic device moves in the forward direction or in the backwards direction, the electronic device determines that the target device is within the FoV of the electronic device based on either (i) the electronic device moves in the forward direction and the range information indicates a decrease in range or (ii) the electronic device moves in the backwards direction and the range information indicates an increase in the range.

In step 1110, the electronic device determines that the target device is within the FoV or outside the FoV of the electronic device based on the first information, the second information, or both the first information and the second information. In certain embodiments, the electronic device determines, based on the motion information, whether the electronic device is in motion. When the electronic device is in motion, the electronic device determines that the target device is within the FoV or outside the FoV of the electronic device based on the second location information. Alternatively, when the electronic device is not in motion, the electronic device determines that the target device is within the FoV or outside the FoV of the electronic device based on the first location information.

In certain embodiments, after determining whether the target device is in FoV or out of FoV, the electronic device performs a smoothing operation to the AoA and range information. For example, the electronic device identifies at different instances in time, AoA and range information between the target device and the electronic device based on the signal information. thereafter the electronic device performs, a smoothing operation on the AoA and the range based on the motion information using a tracking filter.

Although FIG. 11 illustrates an example method, various changes may be made to FIG. 11. For example, while the method 1100 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining signal information based on wireless signals communicated between an electronic device and a target device;
   obtaining motion information based on movement of the electronic device;
   identifying first location information based on the signal information, the first location information indicating whether the target device is within a field of view (FoV) of the electronic device;
   identifying second location information based on the motion information and the signal information, the second location information indicating whether the target device is within the FoV of the electronic device; and
   determining that the target device is within the FoV or outside the FoV of the electronic device based on at least one of the first location information or the second location information.

2. The method of claim 1, further comprising:
   identifying, at different instances in time, angle of arrival (AoA) and range information between the target device and the electronic device based on the signal information; and
   performing, using a tracking filter, a smoothing operation on the AoA and the range information based on the motion information.

3. The method of claim 1, wherein determining that the target device is within the FoV or outside the FoV of the electronic device, comprises:
   determining, based on the motion information, whether the electronic device is in motion;
   when the electronic device is in motion, determining that the target device is within the FoV or outside the FoV of the electronic device based on the second location information; and
   when the electronic device is not in motion, determining that the target device is within the FoV or outside the FoV of the electronic device based on the first location information.

4. The method of claim 1, wherein identifying the second location information based on the motion information and the signal information comprises:
   identifying, at different instances in time, (i) AoA and range information between the target device and the electronic device based on the signal information, and (ii) azimuth angles, elevation angles, and linear acceleration, based on the motion information;
   comparing changes in the AoA in a horizontal plane to changes in the azimuth angles of the electronic device for determining a first indication that the target device is within the FoV or outside the FoV of the electronic device;

comparing changes in the AoA in a vertical plane to changes in the elevation angles of the electronic device for determining a second indication that the target device is within the FoV or outside the FoV of the electronic device;

comparing the range information to changes in the linear acceleration for determining a third indication that the target device is within the FoV or outside the FoV of the electronic device; and identifying the second location information based on the first indication, the second indication, and the third indication.

5. The method of claim 4, wherein comparing changes in the AoA in the horizontal plane to changes in the azimuth angles of the electronic device for determining that the target device is within the FoV of the electronic device, comprises:

determining that the electronic device is rotated in a left direction or a right direction based on (i) a comparison of the linear acceleration in a horizontal direction to a first threshold or (ii) a comparison of variances in the azimuth angles to a second threshold;

in response to determining that the electronic device is rotated in the left direction or the right direction, identifying a correlation between the AoA in the horizontal plane and the azimuth angles; and determining that the target device is within the FoV of the electronic device based on a comparison of the correlation to a third threshold.

6. The method of claim 4, wherein comparing changes in the AoA in the vertical plane to changes in the elevation angles of the electronic device for determining that the target device is within the FoV of the electronic device, comprises:

determining that the electronic device is rotated in an upwards direction or a downwards direction based on (i) a comparison of the linear acceleration in a vertical direction to a first threshold or (ii) a comparison of variances in the elevation angles to a second threshold;

in response to determining that the electronic device is rotated in the upwards direction or the downwards direction, identifying a correlation between the AoA in the vertical plane and the elevation angles; and determining that the target device is within the FoV of the electronic device based on a comparison of the correlation to a third threshold.

7. The method of claim 4, wherein comparing the range information to changes in the linear acceleration for determining that the target device is within the FoV of the electronic device, comprises:

determining that the electronic device moves in a forward direction or in a backwards direction based on the linear acceleration; and in response to determining that the electronic device moves in the forward direction or in the backwards direction, determining that the target device is within the FoV of the electronic device based on either (i) the electronic device moves in the forward direction and the range information indicates a decrease in range or (ii) the electronic device moves in the backwards direction and the range information indicates an increase in the range.

8. An electronic device comprising:
a processor configured to:
obtain signal information based on wireless signals communicated between the electronic device and a target device;
obtain motion information based on movement of the electronic device;
identify first location information based on the signal information, the first location information indicating whether the target device is within a field of view (FoV) of the electronic device;
identify second location information based on the motion information and the signal information, the second location information indicating whether the target device is within the FoV of the electronic device; and
determine that the target device is within the FoV or outside the FoV of the electronic device based on at least one of the first location information or the second location information.

9. The electronic device of claim 8, wherein the processor is further configured to:
identify, at different instances in time, angle of arrival (AoA) and range information between the target device and the electronic device based on the signal information; and
perform, using a tracking filter, a smoothing operation on the AoA and the range information based on the motion information.

10. The electronic device of claim 8, wherein to determine that the target device is within the FoV or outside the FoV of the electronic device, the processor is configured to:
determine, based on the motion information, whether the electronic device is in motion;
when the electronic device is in motion, determine that the target device is within the FoV or outside the FoV of the electronic device based on the second location information; and
when the electronic device is not in motion, determine that the target device is within the FoV or outside the FoV of the electronic device based on the first location information.

11. The electronic device of claim 8, wherein to identify the second location information based on the motion information and the signal information, the processor is configured to:
identify, at different instances in time, (i) AoA and range information between the target device and the electronic device based on the signal information, and (ii) azimuth angles, elevation angles, and linear acceleration, based on the motion information;
compare changes in the AoA in a horizontal plane to changes in the azimuth angles of the electronic device for determining a first indication that the target device is within the FoV or outside the FoV of the electronic device;
compare changes in the AoA in a vertical plane to changes in the elevation angles of the electronic device for determining a second indication that the target device is within the FoV or outside the FoV of the electronic device;
compare the range information to changes in the linear acceleration for determining a third indication that the target device is within the FoV or outside the FoV of the electronic device; and
identify the second location information based on the first indication, the second indication, and the third indication.

12. The electronic device of claim 11, wherein to compare changes in the AoA in the horizontal plane to changes in the azimuth angles of the electronic device for determining that the target device is within the FoV of the electronic device, the processor is configured to:

determine that the electronic device is rotated in a left direction or a right direction based on (i) a comparison of the linear acceleration in a horizontal direction to a first threshold or (ii) a comparison of variances in the azimuth angles to a second threshold;

in response to determining that the electronic device is rotated in the left direction or the right direction, identify a correlation between the AoA in the horizontal plane and the azimuth angles; and determine that the target device is within the FoV of the electronic device based on a comparison of the correlation to a third threshold.

13. The electronic device of claim 11, wherein to compare changes in the AoA in the vertical plane to changes in the elevation angles of the electronic device for determining that the target device is within the FoV of the electronic device, the processor is configured to:

determine that the electronic device is rotated in an upwards direction or a downwards direction based on (i) a comparison of the linear acceleration in a vertical direction to a first threshold or (ii) a comparison of variances in the elevation angles to a second threshold;

in response to determining that the electronic device is rotated in the upwards direction or the downwards direction, identify a correlation between the AoA in the vertical plane and the elevation angles; and determine that the target device is within the FoV of the electronic device based on a comparison of the correlation to a third threshold.

14. The electronic device of claim 11, wherein to compare the range information to changes in the linear acceleration for determining that the target device is within the FoV of the electronic device, the processor is configured to:

determine that the electronic device moves in a forward direction or in a backwards direction based on the linear acceleration; and in response to determining that the electronic device moves in the forward direction or in the backwards direction, determine that the target device is within the FoV of the electronic device based on either (i) the electronic device moves in the forward direction and the range information indicates a decrease in range or (ii) the electronic device moves in the backwards direction and the range information indicates an increase in the range.

15. A non-transitory computer readable medium containing instructions that when executed cause at least one processor to:

obtain signal information based on wireless signals communicated between an electronic device and a target device;

obtain motion information based on movement of the electronic device;

identify first location information based on the signal information, the first location information indicating whether the target device is within a field of view (FoV) of the electronic device;

identify second location information based on the motion information and the signal information, the second location information indicating whether the target device is within the FoV of the electronic device; and determine that the target device is within the FoV or outside the FoV of the electronic device based on at least one of the first location information or the second location information.

16. The non-transitory computer readable medium of claim 15, wherein the instructions that when executed cause the at least one processor to determine that the target device is within the FoV or outside the FoV of the electronic device, comprise instructions that when executed cause the at least one processor to:

determine, based on the motion information, whether the electronic device is in motion;

when the electronic device is in motion, determine that the target device is within the FoV or outside the FoV of the electronic device based on the second location information; and when the electronic device is not in motion, determine that the target device is within the FoV or outside the FoV of the electronic device based on the first location information.

17. The non-transitory computer readable medium of claim 15, wherein the instructions that when executed cause the at least one processor to identify the second location information based on the motion information and the signal information, comprise instructions that when executed cause the at least one processor to:

identify, at different instances in time, (i) AoA and range information between the target device and the electronic device based on the signal information, and (ii) azimuth angles, elevation angles, and linear acceleration, based on the motion information;

compare changes in the AoA in a horizontal plane to changes in the azimuth angles of the electronic device for determining a first indication that the target device is within the FoV or outside the FoV of the electronic device;

compare changes in the AoA in a vertical plane to changes in the elevation angles of the electronic device for determining a second indication that the target device is within the FoV or outside the FoV of the electronic device;

compare the range information to changes in the linear acceleration for determining a third indication that the target device is within the FoV or outside the FoV of the electronic device; and identify the second location information based on the first indication, the second indication, and the third indication.

18. The non-transitory computer readable medium of claim 17, wherein the instructions that when executed cause the at least one processor to compare changes in the AoA in the horizontal plane to changes in the azimuth angles of the electronic device for determining that the target device is within the FoV of the electronic device, comprise instructions that when executed cause the at least one processor to:

determine that the electronic device is rotated in a left direction or a right direction based on (i) a comparison of the linear acceleration in a horizontal direction to a first threshold or (ii) a comparison of variances in the azimuth angles to a second threshold;

in response to determining that the electronic device is rotated in the left direction or the right direction, identify a correlation between the AoA in the horizontal plane and the azimuth angles; and determine that the target device is within the FoV of the electronic device based on a comparison of the correlation to a third threshold.

19. The non-transitory computer readable medium of claim 17, wherein the instructions that when executed cause the at least one processor to compare changes in the AoA in the vertical plane to changes in the elevation angles of the electronic device for determining that the target device is within the FoV of the electronic device, comprise instructions that when executed cause the at least one processor to:
  determine that the electronic device is rotated in an upwards direction or a downwards direction based on (i) a comparison of the linear acceleration in a vertical direction to a first threshold or (ii) a comparison of variances in the elevation angles to a second threshold;
  in response to determining that the electronic device is rotated in the upwards direction or the downwards direction, identify a correlation between the AoA in the vertical plane and the elevation angles; and
  determine that the target device is within the FoV of the electronic device based on a comparison of the correlation to a third threshold.

20. The non-transitory computer readable medium of claim 17, wherein the instructions that when executed cause the at least one processor to compare the range information to changes in the linear acceleration for determining that the target device is within the FoV of the electronic device, comprise instructions that when executed cause the at least one processor to:
  determine that the electronic device moves in a forward direction or in a backwards direction based on the linear acceleration; and
  in response to determining that the electronic device moves in the forward direction or in the backwards direction, determine that the target device is within the FoV of the electronic device based on either (i) the electronic device moves in the forward direction and the range information indicates a decrease in range or (ii) the electronic device moves in the backwards direction and the range information indicates an increase in the range.

* * * * *